(12) United States Patent
Takamatsu et al.

(10) Patent No.: US 8,553,047 B2
(45) Date of Patent: Oct. 8, 2013

(54) IMAGE INFORMATION PROCESSING SYSTEM, IMAGE INFORMATION PROCESSING APPARATUS, IMAGE INFORMATION OUTPUTTING METHOD, CODE INFORMATION PROCESSING APPARATUS AND PROGRAM THEREOF

(75) Inventors: Masahiro Takamatsu, Kanagawa (JP); Satoshi Usui, Kanagawa (JP); Hitoshi Ogatsu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 307 days.

(21) Appl. No.: 12/461,290

(22) Filed: Aug. 6, 2009

(65) Prior Publication Data

US 2009/0295825 A1  Dec. 3, 2009

Related U.S. Application Data

(62) Division of application No. 10/975,001, filed on Oct. 28, 2004, now abandoned.

(30) Foreign Application Priority Data

Sep. 22, 2003 (JP) ............................... P.2003-330705
Sep. 22, 2003 (JP) ............................... P.2003-330767

(51) Int. Cl.
*G09G 5/00* (2006.01)
(52) U.S. Cl.
USPC ........... 345/619; 345/589; 345/593; 345/595; 345/634; 382/163; 382/164; 382/167; 434/98; 434/99; 434/395

(58) Field of Classification Search
None
See application file for complete search history.

(56) References Cited

U.S. PATENT DOCUMENTS

| | | | |
|---|---|---|---|
| 5,423,554 A * | 6/1995 | Davis | 463/4 |
| 5,687,306 A | 11/1997 | Blank | |
| 5,742,520 A | 4/1998 | Uchikawa et al. | |
| 6,901,379 B1 | 5/2005 | Balter et al. | |
| 2003/0033219 A1 * | 2/2003 | Kasahara et al. | 705/27 |
| 2004/0039592 A1 | 2/2004 | Shima | |
| 2005/0187785 A1 | 8/2005 | McIntyre et al. | |

FOREIGN PATENT DOCUMENTS

| | | |
|---|---|---|
| JP | 7-507664 | 8/1995 |
| JP | 08-123958 | 5/1996 |
| JP | 11-001813 | 1/1999 |
| JP | 2001-157201 | 6/2001 |
| JP | 2002-169578 | 6/2002 |
| JP | 2002-207802 | 7/2002 |
| JP | 2002-373266 | 12/2002 |
| WO | WO 93/17517 | 9/1993 |
| WO | WO 94/28490 | 12/1994 |

\* cited by examiner

*Primary Examiner* — Antonio A Caschera
(74) *Attorney, Agent, or Firm* — Morgan, Lewis & Bockius LLP

(57) ABSTRACT

An image information processing system, which processes image information of a customer wearing products, includes: a customer information database, storing customer information in association with customer code information; and a product information database, enabling storage of product information, concerning the products that the customer wears, in association with order code information. Acquisition of the image information of the customer in the state of wearing products is enabled by a digital camera, and by means of a trial fitting catalog preparation process, a trial fitting catalog, in which the image information acquired by the digital camera unit are included with the customer code information of the customer, who wore the products, and the order code information on the products, is prepared and output by a printer.

2 Claims, 15 Drawing Sheets

FIG. 7A

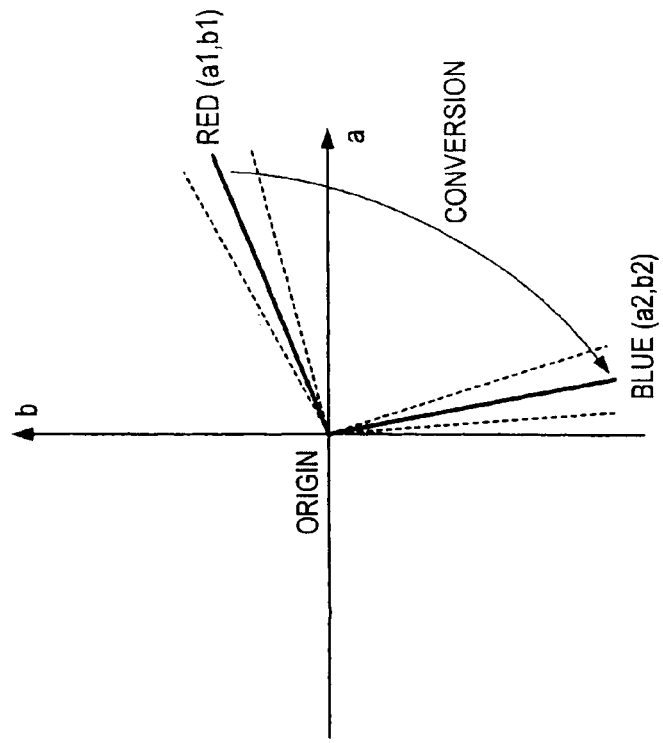

PRODUCT COLOR CONVERSION PROCESS
↓
INPUT PRODUCT COLOR INFORMATION (L*A*B*) — S1121
↓
L*A*B* CONVERSION OF TRIAL FITTING IMAGE DATA — S1122
↓
RECOGNIZE REGION FOR WHICH THE A*B* RATIO IS WITHIN FIXED RANGE AS PRODUCT — S1123
↓
ALLOCATE A*B* VALUES OF PRODUCT PORTION TO A*B* VALUES OF DIFFERENT-COLORED PRODUCT WITH RATIO BEING MAINTAINED — S1124
↓
ALLOCATE L* ACCORDING TO RATIO BEFORE AND AFTER COLOR CHANGE — S1125

FIG. 7B

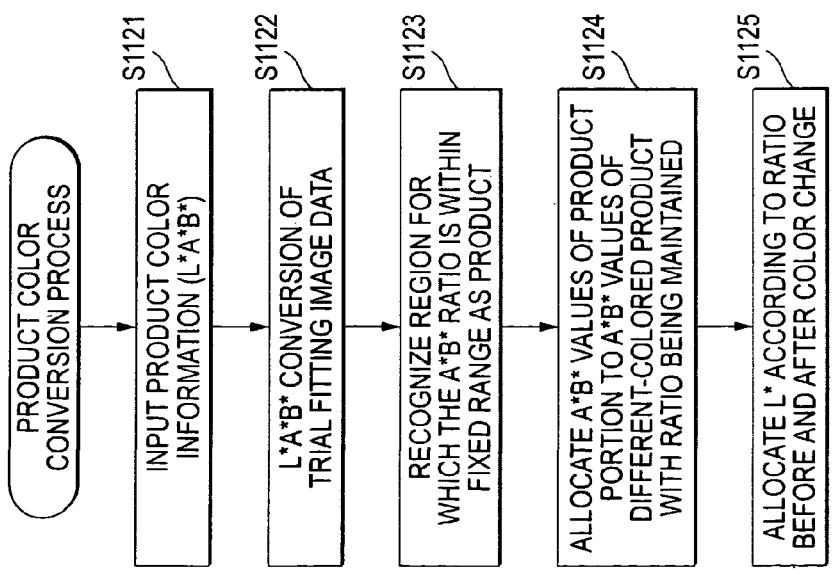

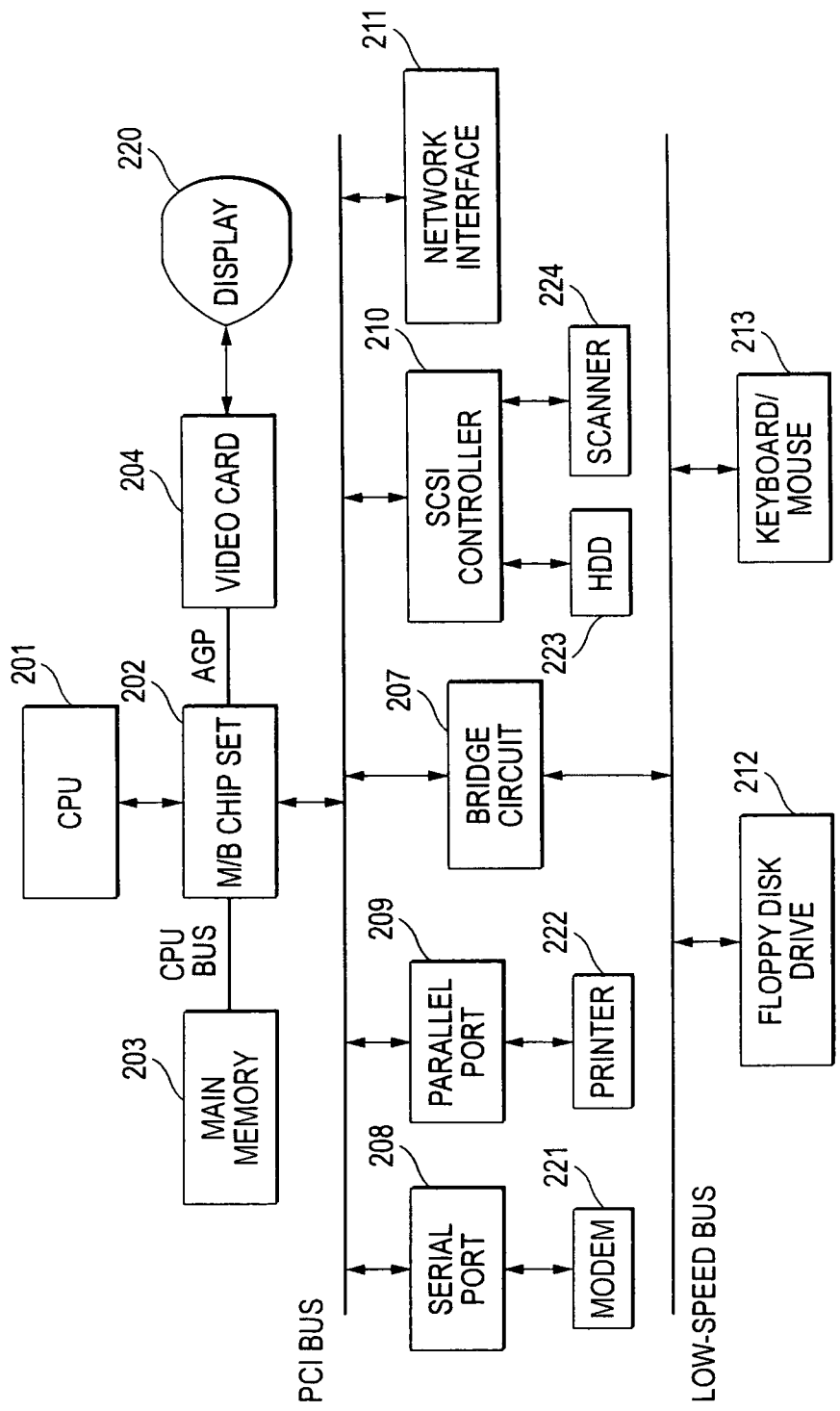

IMAGE INFORMATION PROCESSING SYSTEM, IMAGE INFORMATION PROCESSING APPARATUS, IMAGE INFORMATION OUTPUTTING METHOD, CODE INFORMATION PROCESSING APPARATUS AND PROGRAM THEREOF

This is a divisional application of application Ser. No. 10/975,001, filed on Oct. 28, 2004 now abandoned, which is hereby incorporated by reference.

BACKGROUND OF THE INVENTION

1. Field of the Invention

This invention concerns an image information processing system, etc., that provide image information, and more specifically concerns an image information processing system, etc., that handle image information concerning products worn by a customer or other subject.

2. Description of the Related Art

With the recent advance of information technologies, such as computer devices, networks, etc., business renovations through incorporation of such technologies are being demanded in garment industries, such as apparel makers, high-class boutiques, department stores, clothing stores, etc., as well. In particular, with the activation of electronic commerce via networks, the sales, etc., of garments via networks are being carried out actively.

Furthermore in recent years, with the realization of high-definition digital cameras, it has become possible to obtain high image quality even when image information are output in large formats, such as A4 size, etc. The achievement of high definition is also progressing rapidly in printers, etc., that make use of electrophotographic methods, and it has become possible to output photographic images of high definition, close to that of silver halide photographs, in a simple and yet rapid manner. With such developments in digital imaging arts, the demand for utilizing these digital imaging arts towards fortifying customer services and promoting sales is increasing, for example, in garment industries, etc.

Especially in regard to garment industries, there exists, as a published prior art that makes use of network technologies and digital imaging arts, an art wherein, in a network sales system for selling fashion products via a network, membership information, including personal information, body sizes, and body form images of users, are combined with product images to prepare wearing images that are registered in a database and the registered wearing images are displayed along with product information on user terminals in order to receive orders (see, for example, JP-2002-373266 (pages 7-9, FIG. 1)). There is also disclosed an art, with which information on garments that a user currently owns and the user's own personal information are acquired via a network and garment coordination information are prepared using information on garments, which apparel makers and stores have, to thereby prepare a catalog suited for the wearer (see, for example, JP-2002-169578 (pages 3-4, FIG. 1)). Further more there exists an art, with which an image, for example, of a trial fitting of clothes in a fitting room is taken and the taken image is printed out along with the trial-fitted clothes for visual confirmation of the trial fitting state by the image and facilitation of specification of products in the purchasing process (see, for example, JP-2001-157201 (pages 3-4, FIGS. 3-5)).

SUMMARY OF THE INVENTION

However, with the art described in the above-mentioned JP-2002-373266, since product images and a user's image are simply combined in the form of a simulation, there is a strong sensation of difference with respect to the state of actually wearing the products, and an accurate wearing image cannot be provided. Also, though whether or not the dimensions are appropriate is judged based on the user's body size information, it is difficult to apply all body size dimensions of a user and the provided image thus differs greatly from the state of actually wearing the products. Furthermore, an extremely large amount of time is taken up by the simulation. Also, though the above-mentioned JP-2002-169578 can provide garment information that are customized according to each user, it is difficult to provide products that are matched to the detailed body shape, personality, etc., of a user.

Furthermore, though the above-mentioned JP-2001-157201 excels extremely in that product information are obtained along with a user's trial fitting image, the user's trial fitting image and the product information are handled as information that are separate and independent with respect to each other and no association between these information is provided. In particular, in a store, etc., that provides a trial fitting image, user (customer) information cannot be collected and it is difficult to make connections to subsequent business deals with a customer. Also, since the user's trial fitting image and the product information are handled as separate information, there is no way to obtain product information other than by reading barcodes, etc., contained in the image in the process of ordering products, and the art is thus difficult to deploy, for example, in electronic commerce via a network.

Furthermore, though the above-mentioned JP-2001-157201 excels extremely in that product information are obtained along with a user trial fitting image, the trial fitting images that are provided are limited to just the images of the actual trial fitting of the products. Even when a product is trial fitted and, for example, the size fits a customer wonderfully, it is difficult to trial-fit all products of different colors, etc. In particular, though the maker side that provides the product may have products of different colors, etc., the assortment is not offered in stores in many cases and it is physically difficult to perform trial fitting of such products of different colors, etc. If an image equivalent to the image of a trial-fitted product can be provided for example for a product of different color that a customer has not tried on, it becomes possible to increase the customer's willingness to buy.

This invention provides an image information processing system, which processes image information of a customer wearing products and includes a customer information database, storing customer information in association with customer code information, and a product information database, enabled to store product information concerning the products, worn by the customer, in association with order code information, and with this system, the acquisition of image information of the customer in the state of wearing products is enabled by an image information acquisition unit and the image information acquired by this image information acquisition unit are output along with the customer code information of the customer who wore the products and the order code information on the products.

From another aspect, an image information processing system to which this invention is applied is enabled, by a trial fitting catalog reading unit, to read a trial fitting catalog containing image information of a customer wearing products and information on the product-wearing customer and, by means of a recognition unit, recognizes the information on the customer, contained in the trial fitting catalog that has been read by the trial fitting catalog reading unit. And based on the information on the customer recognized by the recognition unit, customer information are read from a customer information database by means of a customer information reading unit.

Also, an image information processing system to which this invention is applied includes an image information acquisition unit, enabled to acquire image information of a subject wearing products, a color information acquisition unit, acquiring color information on the products worn, a region recognition unit, using the color information acquired by the color information acquisition unit to recognize regions of the products in the image information acquired by the image information acquisition unit, a related product color information acquisition unit, acquiring color information on related products that differ in color from the products worn, and a generating unit, generating converted image information by replacing the color information of the above-mentioned regions in the image information with the color information of the related products acquired from the related product color information acquisition unit.

From another aspect, this invention provides an image information processing system including an image information acquisition unit, enabled to acquire image information, taken under predetermined illumination conditions, of a subject wearing products, a background image removal unit, removing a background image besides the subject in the image information, an illumination information acquisition unit, acquiring illumination information of the image taking that was carried out under the above-mentioned illumination conditions, a synthesis background image acquisition unit, acquiring, from an image information database storing various image information, a synthesis background image to be synthesized, a filtering process unit, applying a filtering process, based on the illumination information acquired from the illumination information acquisition unit and the illumination conditions assumed for the synthesis background image acquired from the synthesis background image acquisition unit, on the image information after removal of the background image by the background image removal unit, and a generating unit, generating converted image information by synthesizing the image information, on which the filtering process has been applied by the filtering process unit, and the background image, acquired by the synthesis background image acquisition unit.

Meanwhile, an image information processing apparatus to which this invention is applied includes an image information acquisition unit, enabled to acquire image information of a customer wearing products, and an output unit, printing out the image information acquired by the image information acquisition unit and customer code information, for reading customer information on the customer stored in a database, at the same time.

Also an image information processing apparatus to which this invention is applied includes an image taking unit, obtaining image information by taking an image of a subject wearing predetermined products, and a product information storage unit, storing product information on the products worn by the subject and related products related to (for example, of the same type as) the above-mentioned products, and reads the product information stored in the product information storage unit and replaces the image parts of the products in the image information obtained by the image taking unit by information on the related products to generate converted image information by means of a converted image information generating unit. The converted image information generated by the converted image information generating unit is printed onto a recording medium by means of a printing unit.

In regard to the category of methods, an image information outputting method to which this invention is applied includes the steps of acquiring image information of a customer wearing products, for example, by means of digital camera, acquiring or generating customer code information, associated with customer information on the customer wearing the products, in a customer information database storing customer information, and acquiring or generating order code information, associated with product information on the products worn by the customer in a product information database, storing product information. This method is characterized in that the acquired image information and the acquired or generated customer code information and order code information are output at the same time.

In regard to the category of methods, an image information outputting method to which this invention is applied includes the steps of acquiring image information of a subject wearing products, acquiring color information on the products from a product information storage unit, recognizing regions of the products in the image information using the acquired color information, acquiring, from the product information storage unit, color information on related products that differ in color from the above-mentioned products, generating converted image information by replacing the color information of the regions of the products in the image information with the color information of the related products, and printing out the generated converted image information.

Also, a code information processing method to which this invention is applied includes the steps of recognizing customer code information from a trial fitting catalog, containing image information of a customer trial fitting on products and customer code information of the customer, and acquiring the customer information from a customer information database based on the recognized customer code information when an order of products is made based on the trial fitting catalog. Order processing, based on the acquired customer information, is then executed and information, related to the trial fitting by the customer and the order, are stored in the customer information database.

This invention can be made to function as a program that realizes predetermined functions in servers and computer devices used by a client, store, etc., which form a system a cross a network. That is, a program to which this invention is applied realizes in a computer the functions of acquiring image information of a customer wearing products, acquiring or generating customer code information, associated with customer information on the customer wearing the products, in a customer information database, storing customer information, acquiring or generating order code information, associated with product information on the products worn by the customer in a product information database, storing product information, and outputting the acquired image information and the acquired or generated customer code information and order code information at the same time.

Also, a program to which this invention is applied realizes in a computer the functions of recognizing customer code information from a trial fitting catalog, containing image information of a customer trial fitting on products and customer code information of the customer, acquiring the customer information from a customer information database based on the recognized customer code information when an order of products is made based on the trial fitting catalog, executing order processing based on the acquired customer information, and storing information, related to the trial fitting by the customer and the order, in the customer information database.

This invention can be made to function as a program that realizes predetermined functions in servers and computer devices used by a client, store, etc., which form a system across a network. That is, a program to which this invention is applied realizes in a computer the functions of acquiring image information of a subject wearing products, acquiring color information on the products from a product information storage unit, recognizing regions of the products in the image information using: the acquired color information, acquiring, from the product information storage unit, color information on related products that differ in color from the above-mentioned products, and generating converted image information by replacing the color information of the regions of the products in the image information with the color information of the related products.

BRIEF DESCRIPTION OF THE DRAWINGS

Preferred embodiments of the present invention shall now be described in detail based on the following figures, wherein:

FIGS. 7A and 7B are diagrams for describing a process for product color conversion in a product image conversion process;

FIG. 13 shows an example of a hardware architecture applicable to a computer device.

DETAILED DESCRIPTION OF THE INVENTION

Embodiments of this invention shall now be described in detail with reference to the attached drawings.

Embodiment 1

Figure 1:
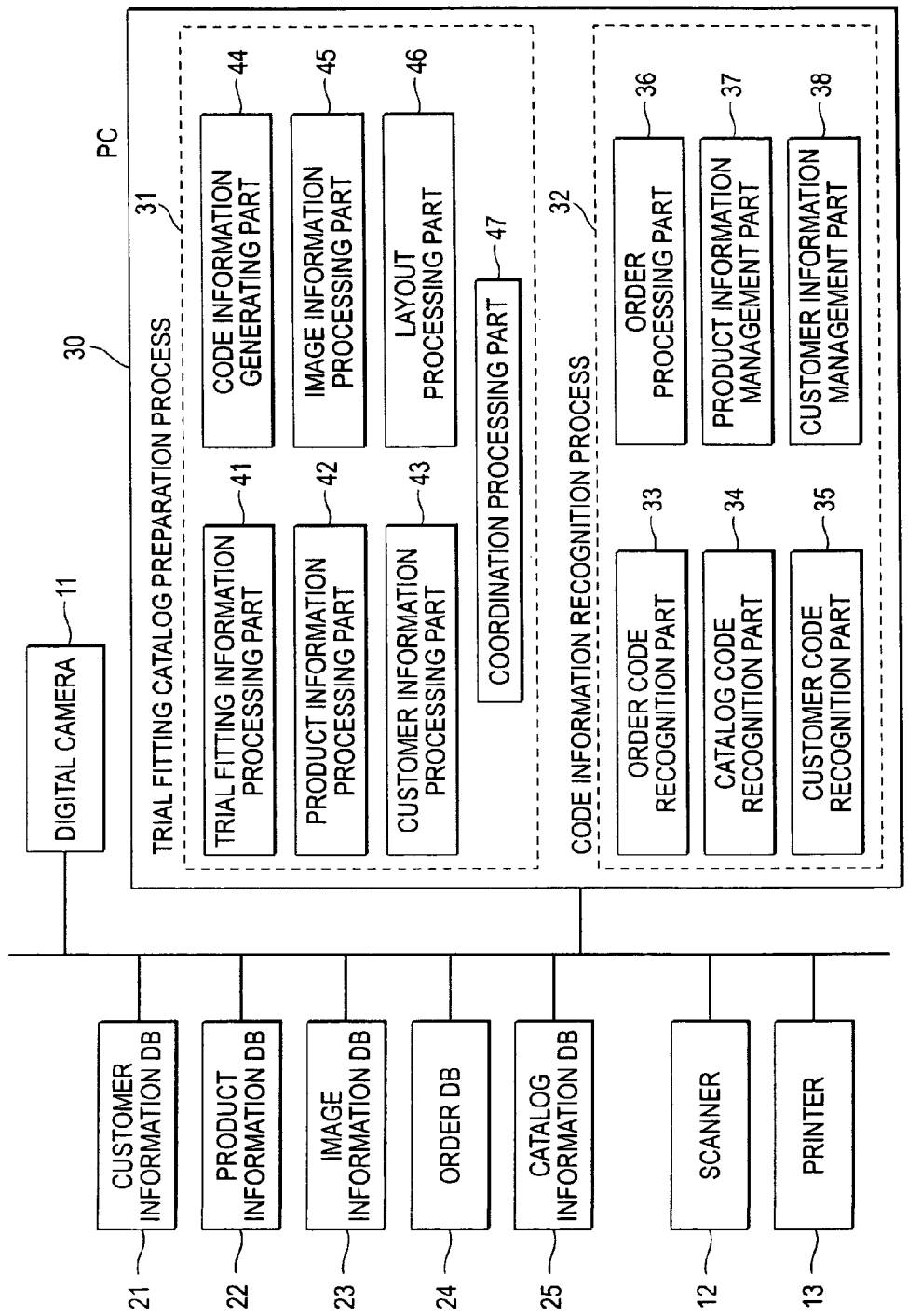
FIG. 1 shows the overall arrangement of an image information processing system to which an embodiment is applied.

FIG. 1 shows the overall arrangement of an image information processing system to which an embodiment is applied. FIG. 1 shows an example arranged as an image information processing apparatus that is placed, for example, in a clothing store, etc. The image information processing system (image information processing apparatus) shown in FIG. 1 is installed, for example, in a trial fitting room and includes a digital camera 11, which is an image taking unit that acquires a digital image by taking the image of a customer trial fitted with products (a subject wearing products), a scanner 12, which reads code information included in a customer-dedicated trial fitting catalog that is provided to the customer, and a printer 13, which, for example, is a laser printer and serves as a printing unit for printing out, onto paper or other printing medium, the customer-dedicated trial fitting catalog provided to the customer. Also as various storage units, various databases, storing data using an auxiliary storage apparatus, such as an external HDD (hard disk drive), external MO (Magneto Optical Disk), etc., are equipped. As the databases, a customer information database (customer information DB) 21, storing various information concerning customers, a product information database (product information DB) 22, storing information on various products that are sold, and an image information database (image information DB) 23, storing various image information, etc., used in preparing the trial fitting catalog, are equipped. Also equipped are an order database (DB) 24, storing various information used in issuing an order based on an order instruction, etc., and a catalog information database (DB) 25, containing information on prepared catalogs. Furthermore, a PC (personal computer) 30 is provided as a computer device for performing the processes of preparing a trial fitting catalog, recognizing code information, etc. With the present embodiment, various information for forming images of related products, such as products of different colors, etc., are contained in product information database 22. Also, besides humans, the subject may be a pet, such as a dog, cat, etc. This embodiment can thus be applied likewise to images of pets, etc., wearing products.

In customer information database 21, customers' addresses, names, ages, occupations genders, sizes (height, weight, bust size, waist size, hip size, etc.), customers' preferences (preferred color, pattern, design, shape), hobbies, as well as, for example, settlement methods and various other data are stored according to customer in the form, for example, of table information. These customer information are verified in the process of logging into the system. When the system is connected to a network, such as that described for Embodiment 2 (to be described later), the registration is carried out via the network. In the case where the system is set up in a store, etc., as shown in FIG. 1, the data are input at the store via PC 30 for example. These registration data are selected according to application. Customer information database 21 also stores records of the trial fitting of products by customers along with relationship information regarding orders made in association to the trial fitting.

Product information database 22 stores, for example, provided information, etc., concerning garments supplied from apparel makers that manufacture and provide garments. The stored data (product information) include various information on products that differ in size, color, material price, etc., and are associated with product codes. Also, prior to the generation of a product code, product information are stored on the basis, for example, of predetermined identification information managed by the apparel maker or other supply source. In this product information database 22, product information on related products are stored in a manner enabling recognition of the relationships of the related products and enabling identification of such relationships, for example, by a relationship information bit. The product information include color information of products expressed, for example, in Lab (CIE L*a*b*) coordinates and pattern information. For example, when a specific product is designated, PC 30 can reference, for example, the relationship information bit provided in product information databases 22 to specify related products. Product information database 22 is arranged so that after the specification of the relationship information, information, such as color information, pattern information, etc., of related products can be provided.

Image information database 23 stores various images, which, for example, are attached to a catalog in the process of issuing a customer-dedicated catalog. Various information, such as photographs to be attached to the cover page, images of general catalog products that are to be attached, background images, illustrations for decorating catalogs, etc., are included. Background images include indoor images, such as those of a wedding reception hall, lounge bar, living room, etc., and outdoor images, such as those of a sea, mountain, town, etc., and these image information are stored in image information database 23. Each background image is stored in image information database 23 in a state in which the brightness of the background image can be recognized, for example, by PC 30.

In order database 24, customer ID's, product codes, and products' colors, patterns, sizes, etc., are stored in association with order numbers. At a store that issues catalogs, order database 24 is accessed using, for example, PC 30 and a table of conversion, from personal IDs', trial fitting catalog numbers, and product numbers indicated in various sheets to product codes, colors, sizes, etc., is managed. This order database 24 clarifies the relationship between order codes and products, and by using the information stored in order database 24, for example, related products that are related to a trial-fitted product can be specified uniquely.

PC 30 is arranged to be able to execute a trial fitting catalog preparation process 31 and a code information recognition process 32.

As trial fitting catalog preparation process 31, a process of generating a customer-dedicated catalog to be output to printer 13 is executed. As further functions for this process, atrial fitting information processing part 41, which processes trial fitting information acquired from digital camera 11, etc., a product information processing part 42, which acquires product information, for example, on the trial-fitted product, from product information database 22 and processes the product information, and a customer information processing part 43, which acquires, from customer information database 21, information on a customer who has actually performed trial fitting and has been taken by digital camera 11, are equipped. A code information generating part 44, which generates code information to be formed on a customer-dedicated catalog based on the processing results of trial-fitting information processing part 41, product information processing part 42, customer information processing part 43, etc., an image information processing part 45, which processes image information obtained from digital camera 11, and a layout processing part 46, which applies a catalog layout process on the code information, generated at code information generating part 44, and the image information, processed at image information processing part 45, are also equipped. Furthermore, a coordination processing part 47, which performs a coordination process in cases where a plurality of products, such as clothes, a bag, a hat, etc., are coordinated and worn in the trial fitting, etc., is equipped.

As code information recognition process 32, a recognition process, based on data read, for example, from scanner 12, is executed in regard to the code information contained in a customer-dedicated trial fitting catalog. As functions for this process, an order code recognition part 33, which recognizes an order code, a catalog code recognition part 34, which recognizes a catalog code, and a customer code recognition part 35, which recognizes a customer code, are equipped. An order processing part 36, carrying out order processing, a product information management part 37, managing product information, and a customer information management part 38, managing customer information, are also equipped. The customer information recognized by customer code recognition part 35 are managed by customer information management part 38, and, for example, when a new purchase request is made, the corresponding information are stored in customer information database 21. This customer information management part 38 has a function of storing relationship information on records of trial fitting by a customer and actual orders in customer information database 21. Also, when, for example, product information, for which are quest for purchase has been made, are recognized by catalog code recognition part 34, the products are specified by product information management part 37 and the various information on the products are stored in product information database 22. Furthermore, arrangements may be made so that information on purchased products are provided by product information management part 37 to the supply sources of the products, etc., via a network, etc.

The customer-dedicated trial fitting catalog that is generated by trial fitting catalog preparation process 31 shall now be described.

Figure 2A:
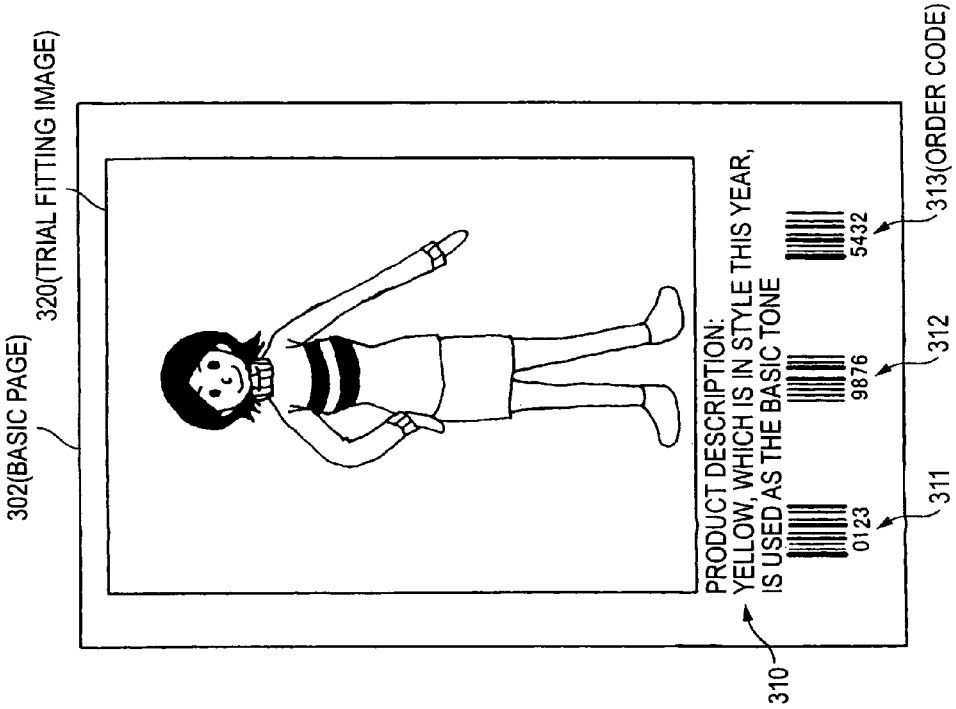
FIGS. 2A and 2B show an example of a trial fitting catalog generated by the embodiment.
Figure 2B:
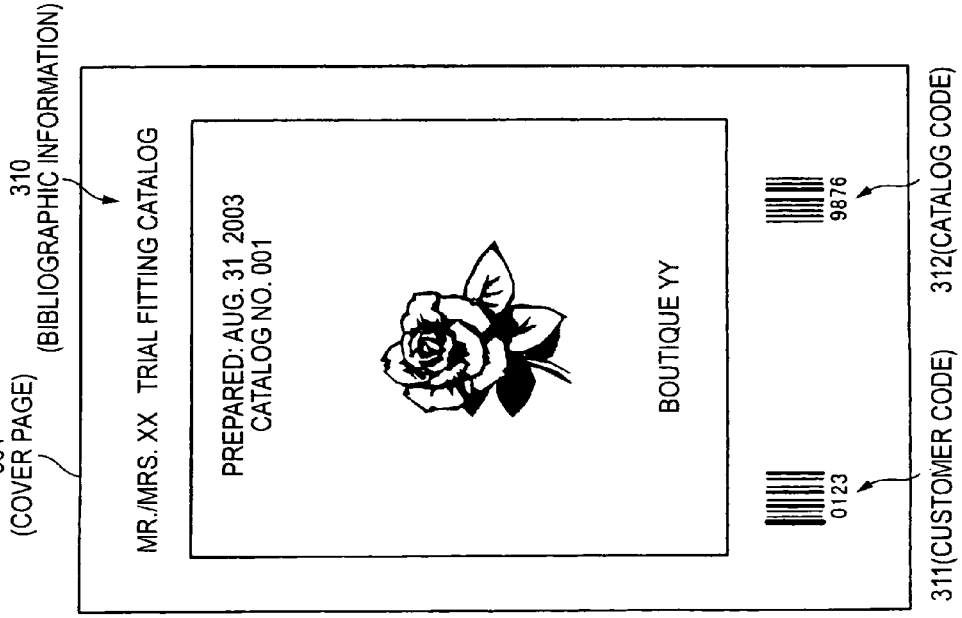
Figure 3A:
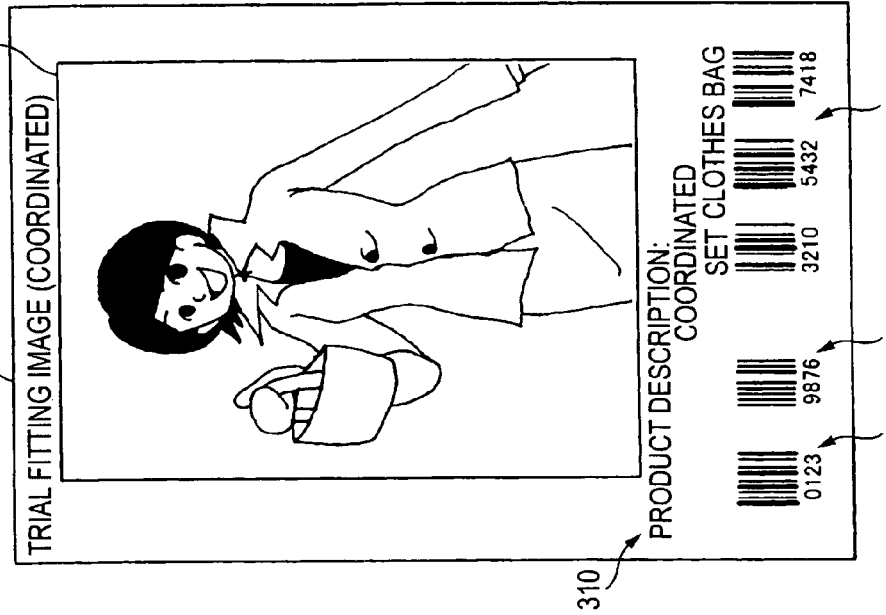
FIGS. 3A to 3D show the example of the trial fitting catalog generated by the embodiment.
Figure 3B:
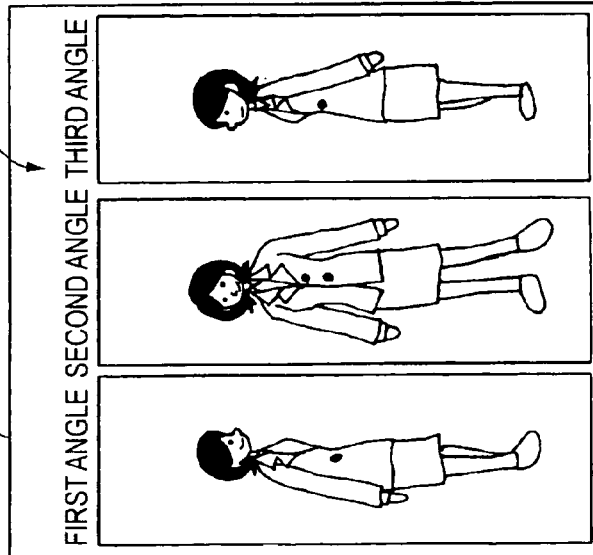
Figure 3C:
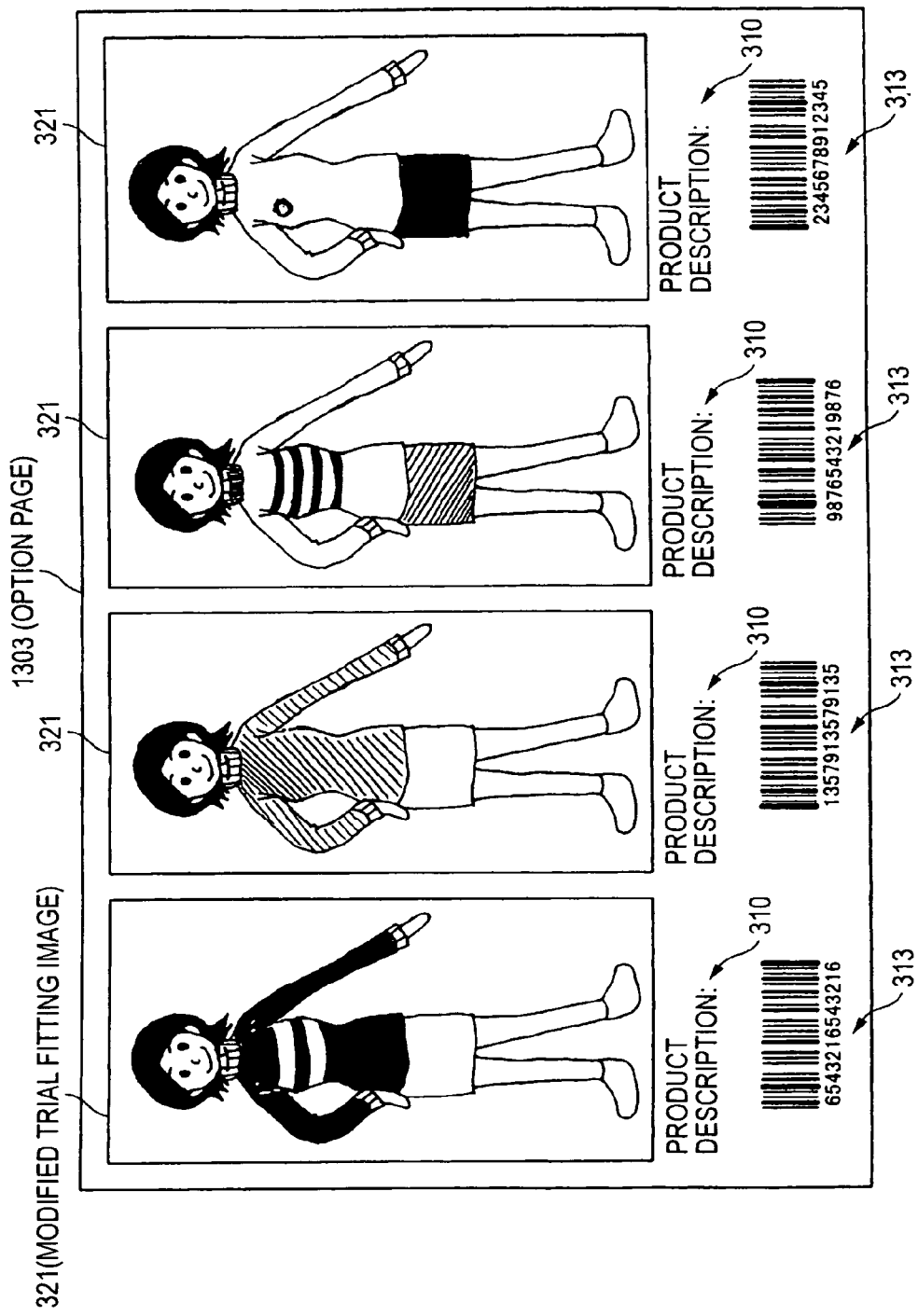
Figure 3D:
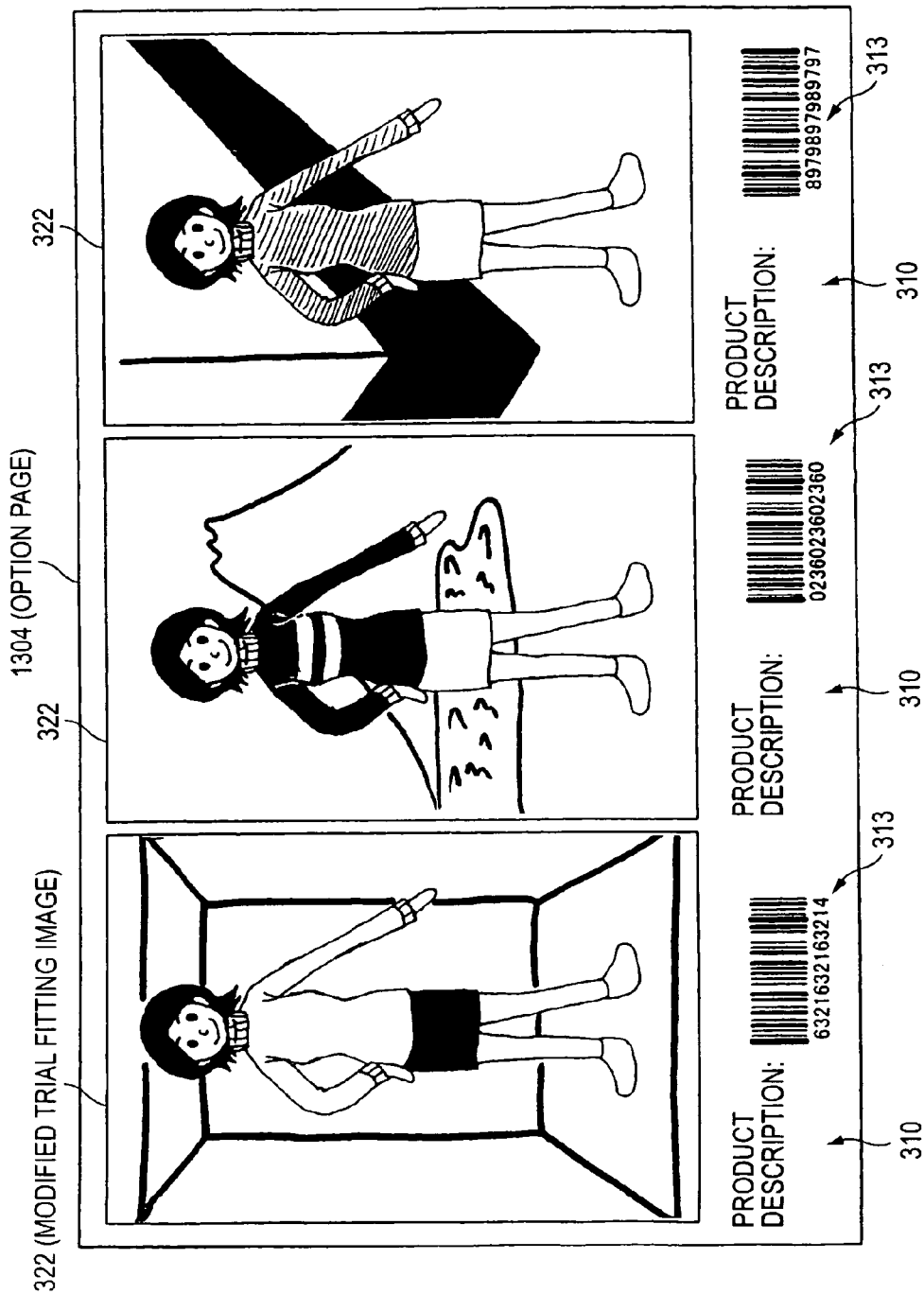

FIGS. 2A and 2B, and FIGS. 3A to 3D are diagrams showing an example of a trial fitting catalog generated by the present embodiment. FIG. 2A shows a cover page 301, which becomes the top sheet of the customer-dedicated trial fitting catalog. FIG. 2B shows an example of a basic page (sheet) 302, having printed thereon a trial fitting image 320, which is an image of a customer trial-fitted with products as it is. FIGS. 3A and 3B show examples of modified image pages (sheets) 303 and 304. Basic page 302 and modified image pages 303 and 304 contain trial-fitting images 320 of the customer trial-fitted with products. FIG. 3C shows an option page 1303, which is an example wherein converted trial fitting images 321, resulting from the conversion of the trial-fitted products to related products that differ in color, pattern, etc., are printed. FIG. 3D shows an option page 1304, which is an example wherein converted trial images 322, resulting from image conversion by the changing of the scene (the background image in the example of the Figure) with respect to the trial fitting image, are printed. The trial fitting catalog is formed as a booklet from a plurality of sheets, such as those shown in FIGS. 2A and 2B, and FIGS. 3A to 3D. As a rule, with this trial fitting catalog, the catalog number and the customer code (to be described later) are all the same. The product information, etc., may differ according to each page in the booklet.

On cover page 301, shown in FIG. 2A, a customer code 311 is indicated in addition to bibliographic information 310. In addition to a customer's personal ID, a trial fitting catalog number, etc., may be included in customer code 311. On basic page 302, shown in FIG. 2B, bibliographic information 310, customer code 311, a catalog code 312, and an order code 313 are indicated along with trial fitting image 320, taken by digital camera 11. Catalog code 312 contains a product number, which can be recognized by the customer, as the main information. Order code 313 contains a product order number, which can be recognized by the customer, as the main information and can be made to encompass product information, such as the sizes, colors, etc., of the products that are trial fitted, and to include trial fitting information (date and time, name of store). This is also used to specify details in cases where different colors, patterns, etc., are available for the same product. Furthermore, a personal ID of a store employee accommodating the customer who tried on the products, etc., may be included as well in some, cases. Each of the respective pages, such as basic page 302 shown in FIG. 2B, thus has a product order number, contained in order code 313, attached along with trial fitting image 320 and functions as a one-page product sheet. Customer code 311, catalog code 312, and order code 313 are prepared as codes that are restricted in the number of digits and can be understood readily by the customer.

With the example of modified image page 303, shown in FIG. 3A, trial fitting images 320, taken by digital camera 11 from multiple directions, such as a first angle, a second angle, and a third angle, are formed, and bibliographic information 310, which are product descriptions concerning the trial-fitted products, customer code 311 of the customer trying on the products, catalog code 312, which is the identification number of prepared catalog, order code 313, etc., are indicated.

With the example of modified image page 304, shown in FIG. 3B, a trial fitting image 320 of coordinating and wearing a plurality of products is output. Also, along with customer code 311, information on the coordination that was realized, that is, for example, the wearing of shoes, hat, necktie, etc., besides clothes, the holding of a bag, and, even for the same clothes, the wearing of a shirt for a purchase request of an outerwear, etc., are indicated. In the case where the customer wears a plurality of products, a coordinated order number, which is the order number of the entirety, and the order numbers of the respective individual products are issued as order codes 313. The customer can order all of the products that were coordinated during trial fitting in a batch with just the single coordinated order number.

The example of option page 1303, shown in FIG. 3C, shows examples wherein product color conversion and other forms of image processing are applied to an image of the customer actually trying on products shown in FIG. 2B. The items of conversion are the colors and patterns of related products (related products with respect to the trial-fitted products) that are stored in product information database 22, and though there may be parts for which the processing is difficult in the case of a complex pattern, in the case of differences of just colors or simple patterns, such as lines, one-point patterns, etc., the image conversion can be applied comparatively readily. In FIG. 3C, four types of converted trial fitting images 321 are shown. Each converted trial fitting image 321 corresponds to a product stored in product information database 22, and with each image, the types of color, pattern, etc., of the related product are determined uniquely by order database 24, which is specified by order code 313. Also to each converted trial fitting image 321, a product description and other bibliographic information 310 are added so that the customer can recognize the details readily.

The example of option page 1304, shown in FIG. 3D, shows examples of forming-converted trial fitting images 322 by applying background processing to the image of the customer actually trying on products. With the examples of converted trial fitting images 322 shown in FIG. 3D, changing of the product color and other forms of image processing are also applied. Here, for example, an indoor image of a lounge bar, etc., an outdoor scene with a mountain and a lake etc., and an outdoor image in a town are selected. Also to each converted trial fitting image 322, a product description and other bibliographic information 310 are added so that the customer can recognize the details readily, and the imaged products can be determined readily by order database 24 that is specified by order code 313. By thus synthesizing background images upon hypothesizing the scenes of use of the products by the customer, the customer can be made to grasp images of using the trial-fitted products more readily. For example, for a customer trying on a bathing suit, a seaside or poolside image is synthesized, etc.

Also the sheets such as those shown in FIG. 2B and FIGS. 3A to 3D have order codes 313 added thereto along with the trial fitting images and each is thus completed as a one-page order sheet. For example at a store, by scanning these codes by scanner 12 or an unillustrated-barcode reader or other code reading apparatus (code reader), products, with which the colors, patterns, etc., are specified, can be selected uniquely. In the case where a plurality of order codes 313 are provided in a single page as shown in FIGS. 3C and 3D, in the reading process, the code information that are read are displayed on a display (to be described later) and made to be selected by an operator (employee) of the store, etc.

The respective code information of customer code 311, catalog code 312, and order code 313 may be regarded as simple functions for simply specifying information stored in the databases. For example, customer code 311 may be regarded as specifying customer information stored in customer information database 21; catalog code 312 may be regarded as specifying product information stored in product information database 22, and order code 313 may be regarded as specifying order information stored in order database 24. Needless to say, when the amounts of information contained in the respective code information are large, arrangements may be made to provide customer information, product information, and order information in complete form by the respective code information.

Also, in regard to the code information, barcode information may be used as information that can be recognized by an apparatus, and besides barcodes, QR (Quick Response) codes, which are two-dimensional codes, etc., may also be used. Arbitrary formats may thus be employed for expressing information, and security may be improved by using codes that cannot be discerned readily. Also, numerical values may be output as information that can be recognized by the customer. Furthermore, in generating the customer-dedicated trial fitting catalog as a booklet of the sheets shown in FIGS. 2A and 2B, and FIGS. 3A to 3D, a general catalog (not shown) may be attached. This general catalog is preferably arranged from product images of general products, in which the customer does not appear, product descriptions, and catalog code 312. This general catalog is generated by image information processing part 45 based on, for example, information read from product information database 22 and image information database 23. Furthermore, though in FIGS. 2A and 2B, and FIGS. 3A to 3D, barcode information, which are large in the number of digits, are used as the code information, simple code information of three to four digits each are preferable for promoting the convenience of telephone ordering or network ordering by customers.

The issuing of the customer-dedicated trial fitting catalog, which is executed mainly in trial fitting catalog preparation process 31 of PC 30, shall now be described.

Figure 4:
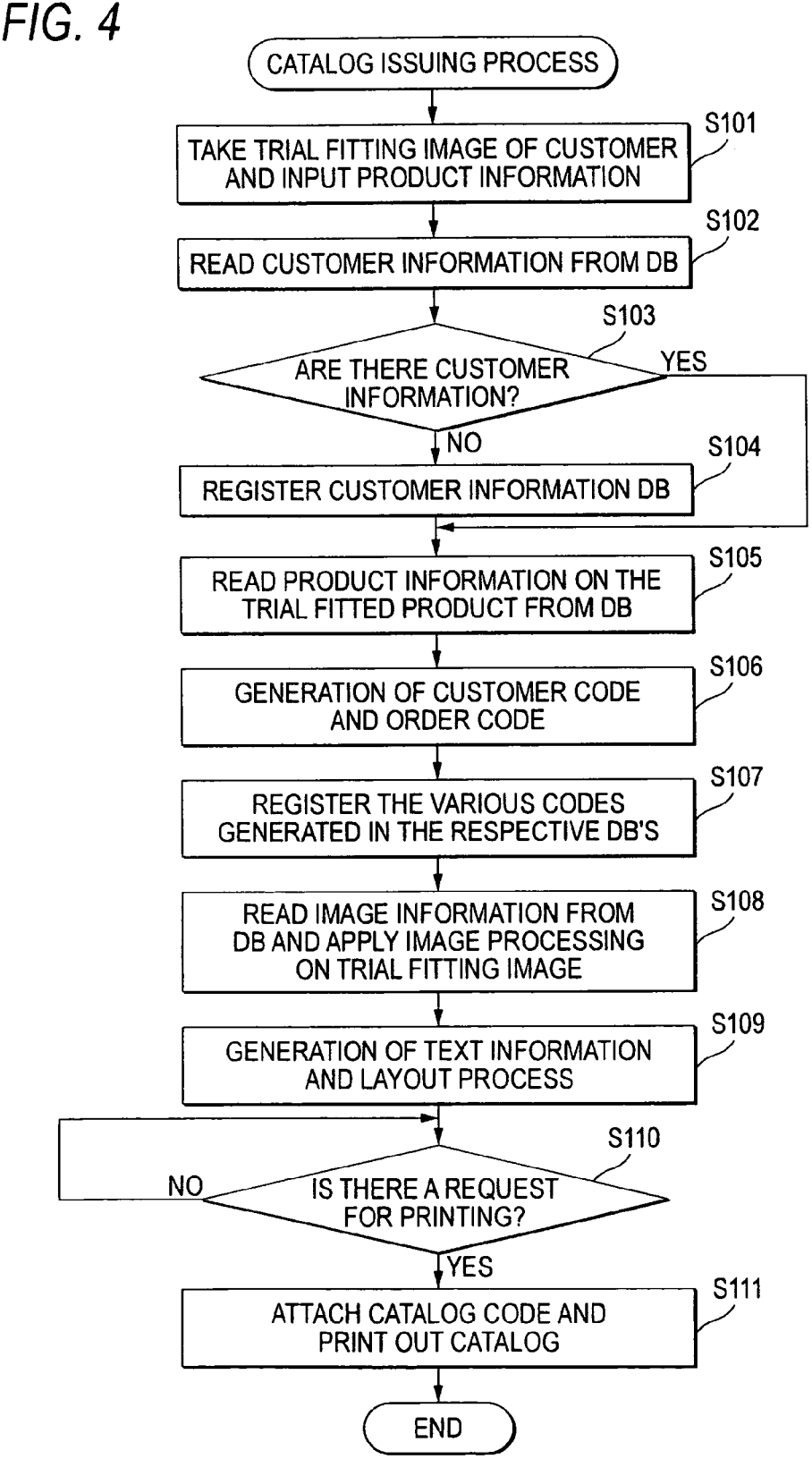
FIG. 4 is a flowchart illustrating a trial fitting catalog issuing process.

FIG. 4 is a flowchart illustrating the trial fitting catalog issuing process. With the image information processing system shown in FIG. 1, first, a trial fitting image is taken by a digital camera 11 and the taken image is taken in by PC 30. Also, product information are in put by means of the barcodes, IC tags, etc., on the tags, etc., on the products (S101). Customer information processing part 43 for trial fitting catalog preparation process 31 reads customer information from customer information database 21 (S102). Customer information database 21 stores customer information, for example, in a state enabling identification by the telephone number or name (in alphabetical order), and customer information processing part 43 uses these information to acquire the customer information. Here, whether or not the customer information exist in customer information database 21 is judged (S103). If the customer information exist, S105 is entered as it is. If the customer information do not exist, customer information processing part 43 displays, on an unillustrated display of PC 30, that the customer information do not exist and urges an operator (for example, a store employee) to input the customer information. When the customer information are input, customer information processing part 43 registers these customer information in customer information database 21 (S104).

Then at product information processing part 42 for trial catalog preparation process 31, the product information of the products that have been trial-fitted by the customer are read from product information database 22 (S105). As mentioned above, product information database 22 has stored therein product information, prepared, for example, by supply sources and corresponding to predetermined identification information. Product information database 22 uses these identification information to acquire the product information. The identification information that product information processing part uses to search the database are acquired, for example, from trial fitting information processing part 41. Here, if the customer is provided with a coordination of products and it is judged, for example, from the information from trial fitting information processing part 41, that the customer is trial-fitted with a plurality of products, the product information of the plurality of products that are trial-fitted are read by coordination processing part 47. Based on the customer information and product information acquired in the above manner, customer code 311 and order codes 313, associated with product code information, color information, size information, trial fitting information, etc., are generated at code information generating part 44 for use in the trial fitting catalog (S106). If customer code 311 and catalog code 312 have been generated in advance, these code information are acquired. Also, code information generating part 44 registers the various code information generated in the above manner in the corresponding databases (S107).

Meanwhile, image information processing part 45 reads image information, such as background information, etc., from image information database 23 and synthesizes the information with the trial fitting image information acquired by means of digital camera 11. Also, predetermined image processing is applied to the trial fitting image information (S108) Thereafter, layout processing part 46 generates text information, such as product descriptions, etc., that are to be indicated to the customer, and performs a layout process of laying out the various codes, generated by code information generating part 44, and the trial fitting image information, processed by image information processing part 45, on, for example, A4 size paper (S109). PC 30 then waits until there is a request for printing (S110), and when a request for printing is made, prints the trial fitting catalog with catalog code 312 attached (S111). The process is thereby ended. The information of the attached catalog code 312 is stored in catalog information database 25.

Figure 6:
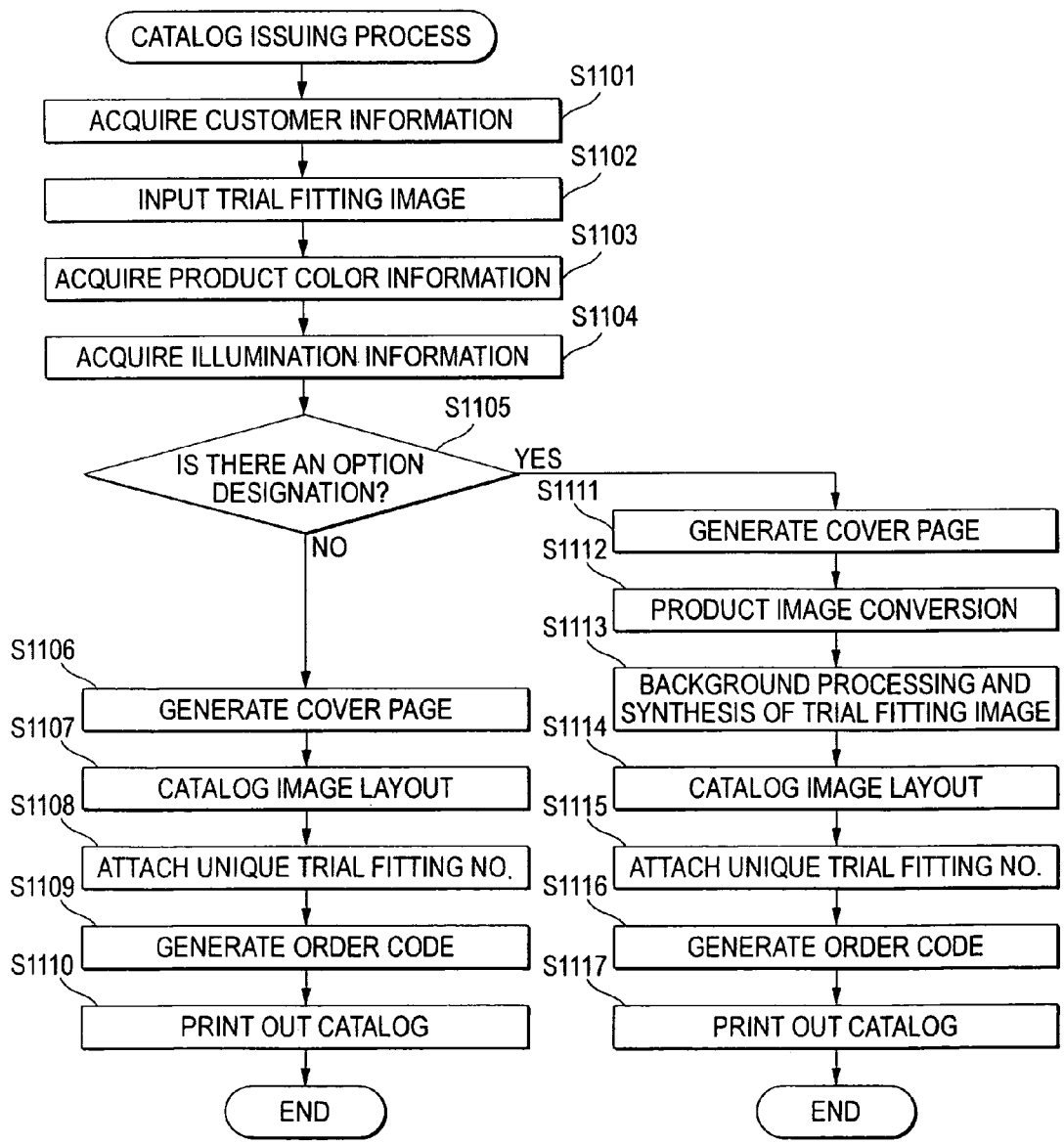
FIG. 6 is a flowchart illustrating a trial fitting catalog issuing process.

FIG. 6 is a flowchart illustrating a trial fitting catalog issuing process. First, at customer information processing part 43, shown in FIG. 1, customer information are acquired from customer information database 21 (S1101). For example, when a customer is designated by the input of a telephone number or name (alphabetical order) or the reading of an ID card, etc., and if the customer information are stored in customer information database 21, the customer information can be acquired at customer information processing part 43 by these designations. Also, if information on the customer for whom a trial fitting image is to be taken does not exist in customer information database 21, customer information processing part 43 displays, on the display (to be described later) of PC 30, that the customer information do not exist and urges an operator (for example, a store employee) to input the customer information. When the customer information are input, customer information processing part 43 registers these customer information in customer information database 21.

An image of a customer wearing products is then taken by digital camera 11 and the trial fitting image that has been taken is input into PC 30 (S1102). At trial fitting information processing part 41, product information are input by means of barcodes, IC tags, etc., that are attached to tags, etc., on the products, and product color information, including, for example, Lab (CIE $L^*a^*b^*$) coordinates, are acquired (S1103). Also at trial fitting information processing part 41, information on the illumination during the taking of the trial fitting image are acquired (S1104). Whether or not an option designation is made is then judged (S1105). If an option designation is not made, the generation of cover page 301 shown in FIG. 2A (S1106) and a catalog image layout process by layout processing part 46 (S1107) are carried out as normal processes. Also, for example, a unique trial fitting number is provided by product information processing part 42 (S1108) and order codes 313 are generated by code information generating part 44 (S1109). Thereafter, the trial fitting catalog is printed by printer 13 (S1110) and the process is ended.

Meanwhile, if an option designation is made at S1105, after the generation of cover page 301 shown in FIG. 2A (S1111), a product image conversion process of converting the product colors, etc., is executed at image information processing part 45, based on the illumination information acquired in S1104 and the product color information acquired in S1103 (S1112). Also, image information processing part 45 uses image information stored in image information database 23 to perform a background process on the trial fitting image and carries out synthesis of the products, subject to the product image conversion in S1112, with the customer and the background (S1113). A catalog image layout process by layout processing part 46 (S1114) is then carried out. Also, for example, a unique trial fitting number is provided by product information processing part 42 (S1115) and order codes 313 are generated by code information generating part 44 (S1116). Thereafter, the trial fitting catalog is printed by printer 13 (S1117) and the process is ended. Order codes 313, generated by code information generating part 44, are registered in order database 24 and used for processing orders from the customer.

The product image conversion process, indicated in S1112, shall now be described.

FIGS. 7A and 7B are diagrams for describing a process for product color conversion in the product image conversion process. FIG. 7A illustrates the flow of the product color conversion process that is carried out in image information processing part 45 and FIG. 7B shows an example of conversion from a red dress to a blue dress by means of an $a^*b^*$ coordinate system (a, b). The abscissa axis indicates a (the $a^*$ value) and the ordinate axis indicates b (the $b^*$ value). As shown in FIG. 7A, in the product color conversion process, first, product color information ($L^*a^*b^*$) are input from among the product information stored in product information database 22 (S1121) An $L^*a^*b^*$ conversion is then applied to the trial fitting image data that have been acquired, for example, under the RGB color system (S1122). From among the trial fitting image data that have been subject to $L^*a^*b^*$ conversion, a region within a fixed a*b* ratio range is recognized as being a product (S1123). With the graph shown in FIG. 7B, a region with in a fixed range, indicated by the broken lines at the red portion, is recognized to be the product.

Thereafter, the a*b* values of the product portion of the trial fitting image data are allocated to the a*b* values of a different-colored product with the ratio being maintained (S1124). That is, as shown in FIG. 7B, the product data of the trial-fitted product and the product data of the different-colored product, which are stored in product information database 22, are referenced and the a*b* values (a1, b1), of the trial-fitted product are converted to the a*b* values (a2, b2) of the different-colored product. For example, the ratio of the a*b* values (a1, b1) of the product data to the a*b* information (aS, bS) of the product during the taking of the trial fitting image is determined, and this ratio is applied to the a*b* values (a2, b2) of the different-colored product. Here, conversion is carried out in proportion to the distances of the respective points from the origin. L* is then allocated according to the ratio before and after the color change (S1125) For this allocation of L*, the ratio of the L* value (L1) of the product data to the L* information (LS) of the product during the taking of the trial fitting image is determined, and this ratio is applied to the L* value (L2) of the different-colored product. The processes for product color conversion are executed in this manner.

The trial fitting image background process and synthesis, indicated by S1113, shall now be described.

Figure 8A:
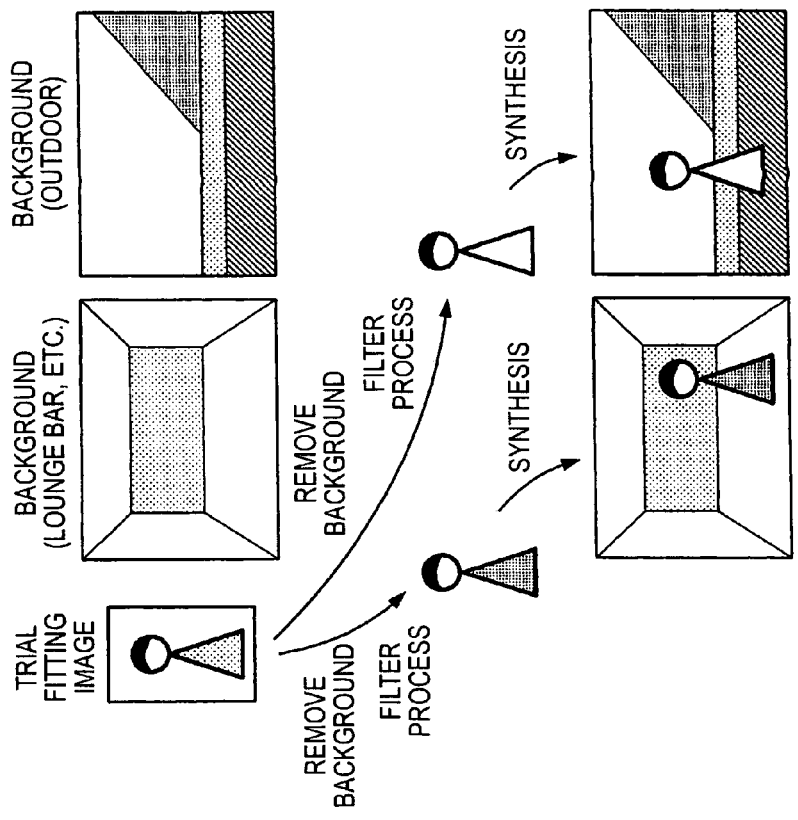
FIGS. 8A and 8B are diagrams for describing a trial fitting image background process and synthesizing process.
Figure 8B:
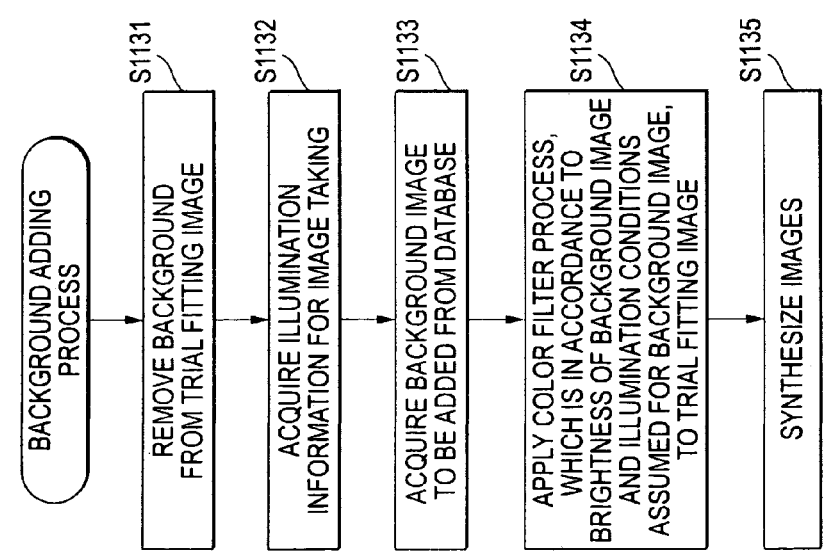

FIGS. 8A and 8B are diagrams for describing a trial fitting image background process and synthesis process. FIG. 8A shows the flow of a background adding process that is executed at image information processing part 45, and FIG. 8B shows two processing examples of synthesizing a trial fitting image and a background image. First as shown in FIG. 8A, the removal of the background from the trial image acquired from digital camera 11 is executed at image information processing part 45 (S1131). Also at trial fitting information processing part 41, the illumination conditions during image taking are acquired based, for example, on the information acquired in advance at trial fitting information processing part 41 (S1132). The ascertained illumination conditions are, for example, fluorescent lamp, incandescent lamp, sunlight, etc., and the illuminance, etc., are also ascertained. For the trial fitting image background process, it is preferable that the trial fitting room or the image taking background be a fixed environment. For example, if the background is fixed as a white or gray background, the background process is facilitated.

Here, at image information processing part 45, the background information to be added are acquired from image information database 23 (S1133). For this acquisition, for example, a mode wherein background information are arranged as thumbnails and displayed in the form of a list on a display, etc., and the acquisition is carried out by recognizing an arbitrarily selected thumbnail from the list may be considered. Also, arrangements may be made so that image information processing part 45 selects background information that are set in advance according to each product, and it is effective to set in advance, according to each product, usage circumstances that are imaged for the product, for example, as in setting a mountain scene for an outdoor product, a seaside scene for a bathing suit, a party hall for a formal wear product, etc.

A color filter process, which is in accordance to the brightness of the background image and the illumination conditions assumed for the background image, is then applied to the trial fitting image at image information processing part 45 (S1134). In FIG. 7B, the two examples of a "lounge bar, etc." and an "outdoor" scene are provided as background images. For example for the "lounge bar, etc." background, a case where the illumination is dark and yellowish can be considered. A filter process that is in accordance to a yellowish illumination condition is thus applied to the trial fitting image. Also in the case of the "outdoor" scene, for example, a filtering process that makes the image vivid is applied. The trial fitting image to which such a filtering process has been applied and the background image are then synthesized (S1135) to generate a converted trial fitting image 322 to be attached to the trial fitting catalog.

In the process of synthesizing the trial fitting image and the background image, color conversion of the products, etc., such as illustrated in FIGS. 7A and 7B, may also be applied at the same time. By applying both the process shown in FIGS. 7A and 7B and the process shown in FIGS. 8A and 8B, converted trial fitting images 322, such as those shown in FIG. 3D, can be obtained.

A code information recognition process, which is mainly executed in code information recognition process 32 of PC 30 shall now be described.

Figure 5:
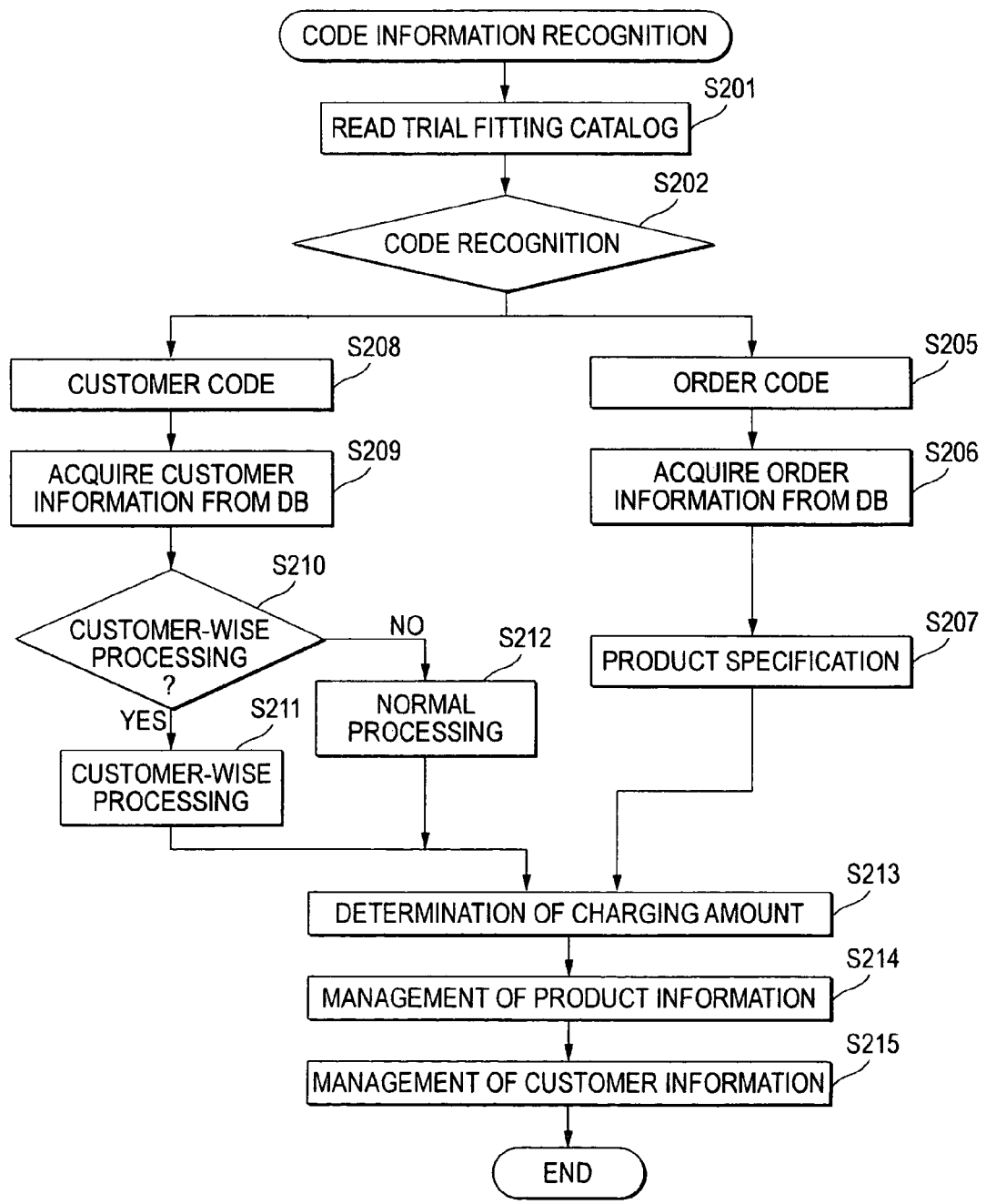
FIG. 5 is a flowchart illustrating a code information recognition process.

FIG. 5 is a flowchart illustrating the process for code information recognition. PC 30 reads in a trial fitting catalog using, for example, scanner 12 (S201). Code recognition is then carried out (S202). First, by means of customer code recognition part 35 and catalog code recognition part 34, customer code 311 and catalog code 312 are read from the cover page and specification of the customer and the catalog is carried out. Customer code 311 and catalog code 312 may be contained in each catalog sheet. An order code 313 is then recognized from a trial fitting catalog sheet by means of order code recognition part 33 (S205). When an order code 313 is recognized by means of order code recognition part 33, the order information identified by that order code 313 are acquired from order database 24 (S206). Then based on the order information acquired in this manner, a product is specified (S207). Arrangements may be made to combine the respective information of customer code 311 and catalog code 312 and acquire the corresponding product information from product information database 22.

Meanwhile, upon recognizing customer code 311 by means of customer code recognition part 35 (S208), the customer information identified by that customer code 311 are acquired from customer information database 21 (S209). Here, at order processing part 36, whether or not customer-wise processing is necessary in processing the product order is judged from the customer information (S210). Specifically, whether or not the customer is registered as a trusted customer, whether or not the customer is one who has secured service points of a predetermined amount or more, etc., is judged. If customer-wise processing is judged to be necessary, customer-wise processing is executed, for example, in regard to the price of the product, etc., (S211). If customer-wise processing is not necessary, normal processing is executed (S212).

At order processing part 36, the amount to be charged to the individual customer in accordance to the specification of the product in S207 and the processing of S211 or S212 is determined (S213). The charging amount that has been determined is notified to the customer by being displayed, for example, on a display (to be described later), etc., that the customer can view. When the order processing of the product is carried out in the above-described manner, product information management part 37 carries out product information management by storing the sales record of the product and the specific type (color, size, etc.) of the product and other product information in product information database 22 (S214). Also, customer information management part 38 manages customer information by ascertaining the relationship between the customer and the product, which has been trial fitted and has been actually purchased, and storing specific customer trends in customer information database 21, which is identified, for example, by the customer ID, etc., (S215). The customer information stored in customer information database 21 may include for example, in addition to general customer attribute information and product preferences of the customer, the time lag between the date and time of actual trial fitting and the date and time of ordering, the relationship between the amount of trial fitting and the purchase record, the relationship between the image taking method and the purchase record, the relationship between the trial fitting image presentation method and the purchase record, and other information useful for analyzing the customer.

Figure 9:
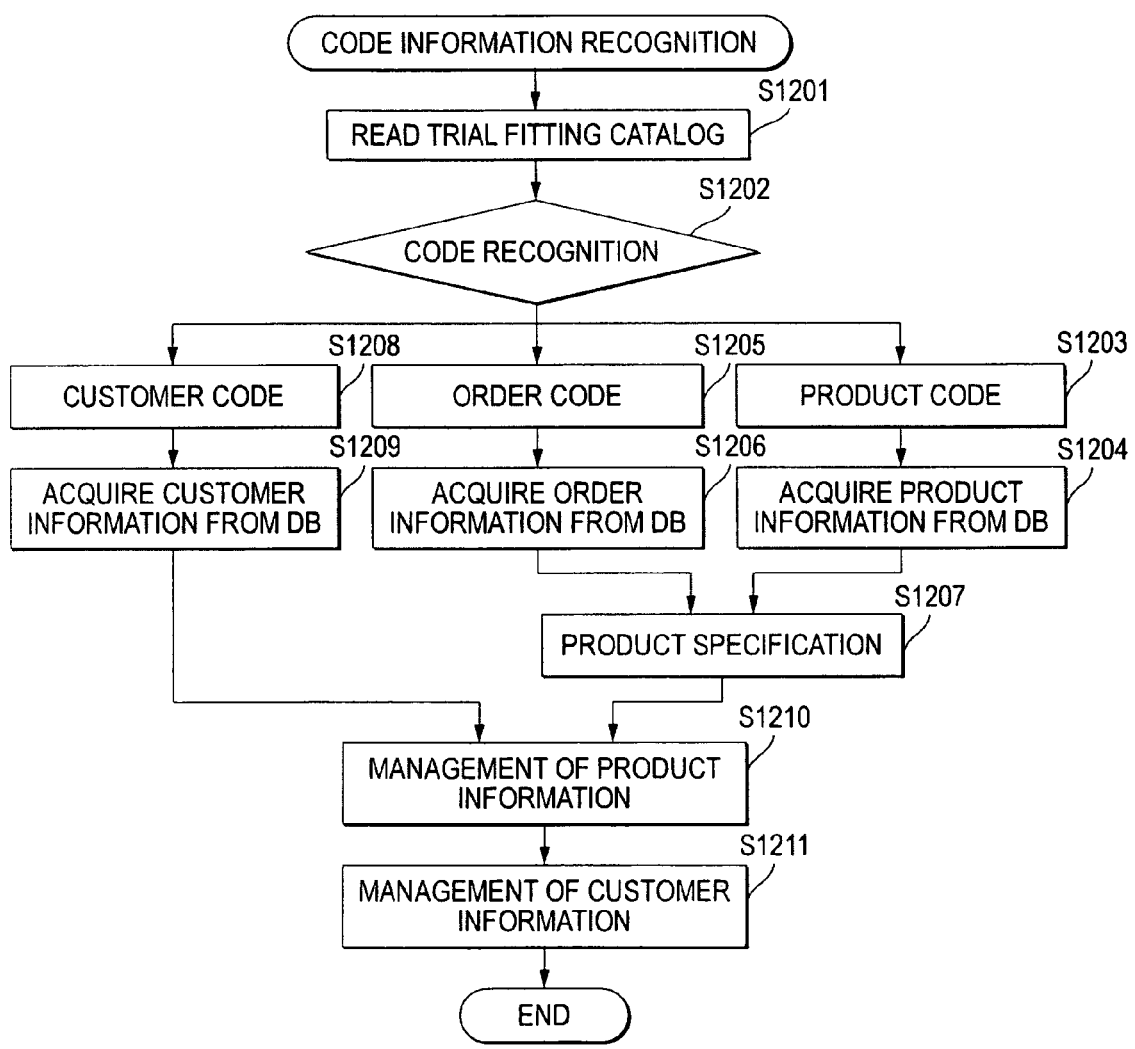
FIG. 9 is a flowchart illustrating a code information recognition process.

FIG. 9, is a flowchart illustrating a process of recognizing code information from a trial fitting catalog. PC 30 uses, for example, scanner 12 to read a trial fitting catalog (S1201). Code recognition is then carried out by means of catalog code recognition part 34 (S1202). If a catalog code is recognized (S1203), the product information identified by that catalog code 312 is acquired from product information database 22 (S1204).

If an order code 313 is recognized by order code recognition part 33 (S1205), the order information identified by that order code 313 is acquired from order database 24 (S1206). Based on the product information and order information thus acquired, specification of the product is carried out (S1207). Specifically, when for example, one order code is designated and recognized from among order codes 313 that are provided in correspondence to converted trial fitting images 321 and 322, such as those shown in FIG. 3C and FIG. 3D, order code recognition part 33 uses the recognized order code 313 to read order information from order database 24 and uses the product information stored in product information database 22 to specify a single product of a specific color, pattern, size, etc.

Meanwhile, if a customer code 311 is recognized by customer code recognition part 35 (S1208), the customer information identified by that customer code 311 are acquired from customer information database 21 (S1209).

When the product order processing is carried out in the above-described manner, product information management part 37 stores the sales record of the product and the specific type (color, size, etc.) of the product and other product information in product information database 22 and carries out product information management based on the customer information that have been read (S1210). Also, customer information management part 38 performs a predetermined form of customer information management by ascertaining the relationship between the customer and the product, which has been trial fitted and has been actually purchased, ascertaining the circumstances of response to the presentation of converted trial fitting images 321 and 322, and storing specific customer trends in customer information database 21, which is identified, for example, by the customer ID, etc., (S1211). The code information recognition process is thereby completed. The customer information stored in customer information database 21 may include, in addition to general customer attribute information and the product preferences of the customer, for example, the time lag between the date and time of actual trial fitting and the date and time of ordering, the relationship between the amount of trial fitting and the purchase record, the relationship between the image taking method and the purchase record, the relationship between the trial fitting image presentation method and the purchase record, etc., and the responses to converted trial fitting images 321 and 322 are also managed according to customer.

Thus with the present embodiment, by adding customer information (customer code 311) to the trial fitting catalog cover page or trial fitting image 320 of a product, customer-specific processing can be executed. From the fact that "a customer has trial fitted (put on) a product," it can be assumed that the customer is extremely interested in the trial-fitted product. Especially in the case where the customer agrees to leave the trial fitting result as an image, it can be assumed that the degree of satisfaction in regard to the trial-fitted product is considerably high. The trial fitting records of a customer (especially the records of leaving trial fitting images) can thus be said to be extremely effective information for ascertaining the customer's preferences concerning garment products, preferences concerning coordinated products, color preferences, etc., With the present embodiment, trial fitting images (trial fitting image 320) can be presented to a customer in the form of a catalog and the trial fitting record information can be stored in customer information database 21 and managed along with customer information. That is, information, including that indicating that a customer has put on a product, are stored in customer information database 21. Information on the relationship between trial fitting and actual ordering are ascertained according to each customer and managed in consideration of the product information stored in product information database 22 as well. Finely-tuned sales strategies can thus be deployed according to each customer.

Also with the present embodiment, arrangements are made to provide customer-wise trial fitting catalogs by providing trial fitting images 320 of products and also generating converted trial fitting images 321 and 322 for virtually showing the trial fitting results of related products. From the fact that "a customer has trial fitted (put on) a product," it can be assumed that the customer is extremely interested in the trial-fitted product. Especially in the case where the customer agrees to leave the trial fitting result as an image, it can be assumed that the degree of satisfaction in regard to the trial-fitted product is considerably high. The presentation of a trial fitting catalog that includes such a trial fitting image 320 can thus be said to be useful for sales promotion. Converted trial fitting images, with which color changes, simple pattern changes, etc., are applied to such trial-fitted products of comparatively high degree of satisfaction, are also added to the trial fitting catalog. That is, even if products (related products) of the same category as the trial-fitted product are not actually trial fitted, images equivalent to those of trial fitting images are provided. The sales promotion effect can thereby be heightened further. In the case where orders are made for the products of these converted trial fitting images 321 and 322, the garment product preferences, etc., of the customer can be ascertained at customer information management part 38 and such information can become effective for subsequent formulation of sales strategies.

Embodiment 2

For Embodiment 1, a description was provided based on an image information processing system that is set up in a store, etc., as shown in FIG. 1. For the present embodiment, an image information processing system arranged across a network, such as the internet, shall be described.

For functions that are the same as those of Embodiment 1, the same symbols shall be used and detailed description thereof shall be omitted here.

Figure 10:
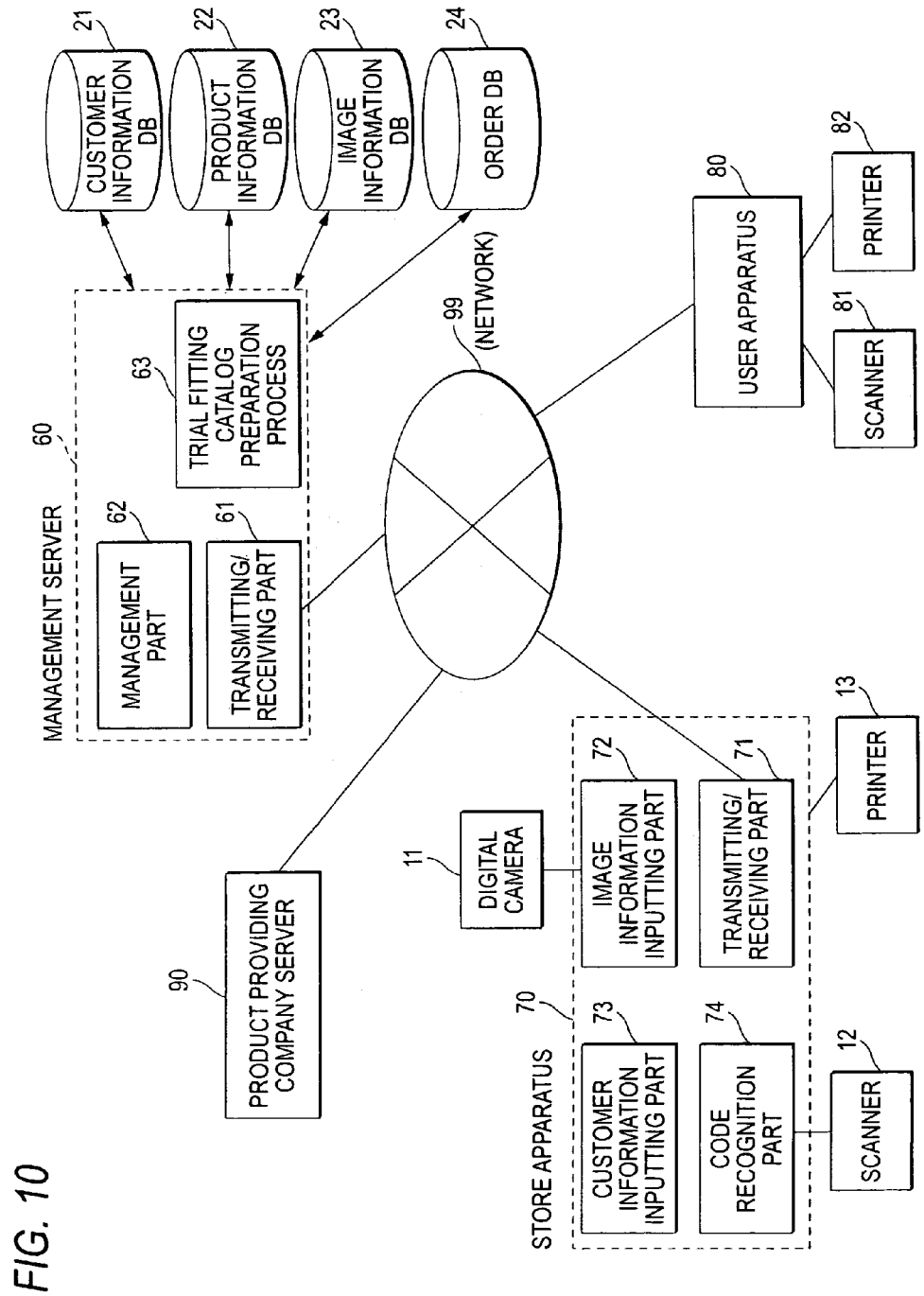
FIG. 10 shows the overall arrangement of an image information processing system arranged across a network.

FIG. 10 shows the overall arrangement of an image information processing system arranged across a network 99. The example shown in FIG. 10 is characterized in that the functions that are provided in the store, etc., shown in FIG. 1 are partially distributed among a management server 60, a store apparatus 70, which is a terminal positioned in a store, etc., at which a trial fitting image is taken, and a user apparatus, which is a terminal of a customer who has trial fitted on products and are connected via network 99. Also, a product providing company server 90 of an apparel maker, etc., that provides the products is connected to network 99. A PC or other computer device may be used as management server 60, store apparatus 70, user apparatus 80, and product providing company server 90. This network 99 may be a wide-area public network, such as the internet, or a local network. This embodiment's system may also be structured in a closed form, such as an intra-company intranet.

With the example shown in FIG. 10, management server 60 is equipped with a transmitting/receiving part 61, for executing transmission/receiving via network 99, for example, with store apparatus 70 and product providing company server 90, a management part, managing product information, customer information, etc., and a trial fitting preparation process 63, having functions equivalent to trial fitting catalog preparation process 31, shown in FIG. 1. Also, as various databases equivalent to those shown in FIG. 1, management server 60 is equipped with customer information database 21, product information database 22, image information database 23, and order database 24. An unillustrated catalog information database is also equipped. These databases may not be directly connected to management server 60 and, for example, may be provided in another database server accessed via network 99. The respective databases may also be distributed among a plurality of servers.

Meanwhile store apparatus 70 is equipped with a transmitting/receiving part 71, which executes transmission/receiving via network 99, for example, with management server 60 and user apparatus 80, an image information inputting part 72, which inputs customer trial fitting images (trial fitting image 320) obtained from a digital camera 11, a customer information inputting part 73, which inputs customer information, and code recognition part 74, which recognizes various codes read from a scanner 12. For example, scanner 12 for inputting code information, and a printer 13 for outputting a trial fitting catalog are also equipped. With the example shown in FIG. 10, a part of order processing part 36 of code information recognition process 32, shown in FIG. 1, and the respective management functions of product information management part 37 and customer information management part 38 are transferred to management server 60 and code recognition part 74 is left with the respective code recognition functions of order code recognition part 33, catalog code recognition part 34, and customer code recognition part 35.

User apparatus 80 is arranged to be connectable for example to a scanner 81 for inputting code information, a printer 82 for outputting a trial fitting catalog, etc.

Product providing company server 90 provides various information and code information on currently provided products, product size and color information, etc., that are included in the codes, information on new products, information on various services, etc.

Figure 11:
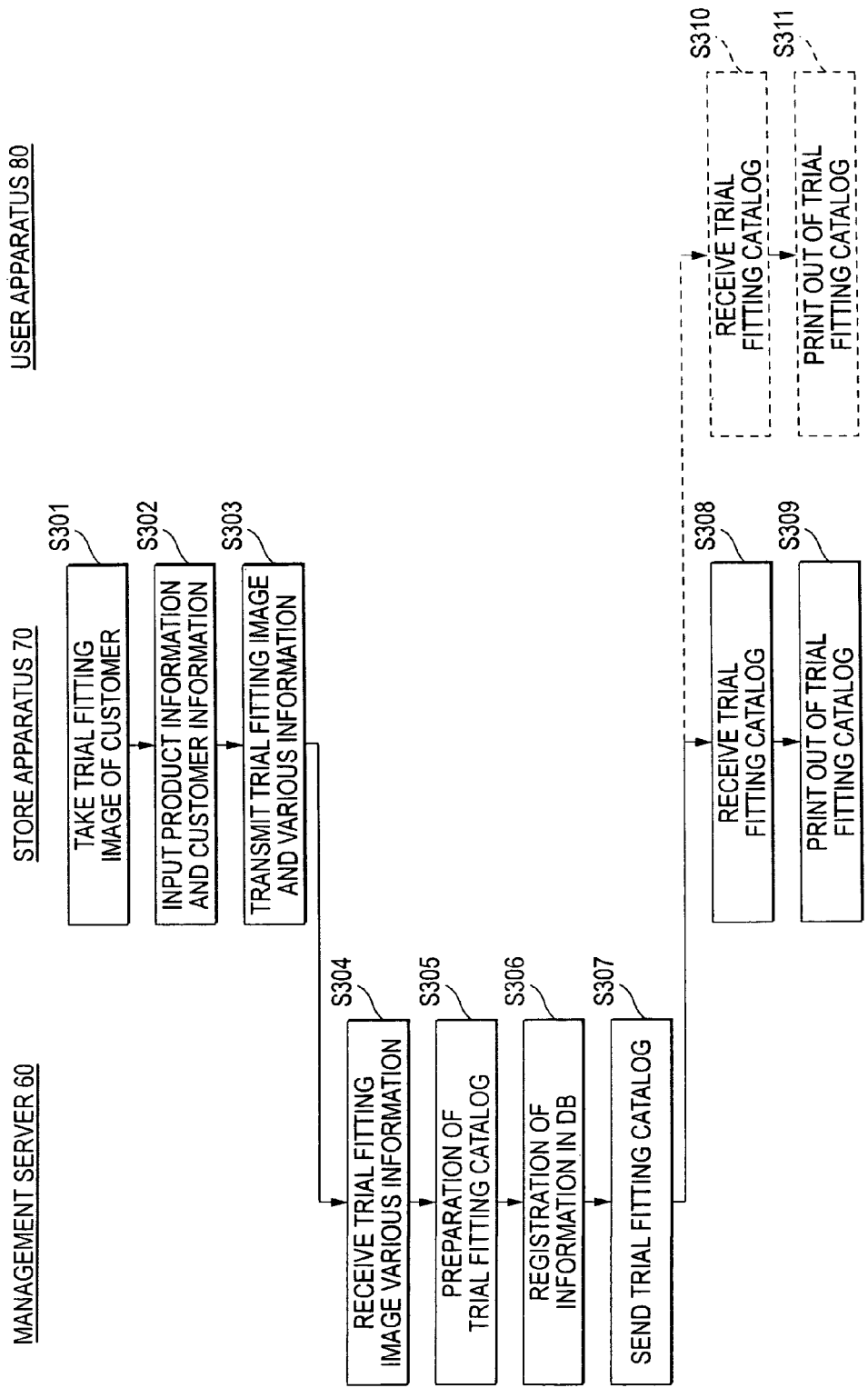
FIG. 11 is a flowchart illustrating a trial fitting catalog outputting process among the processes of the image information processing system arranged across a network shown in FIG. 10.

FIG. 11 is a flowchart illustrating a trial fitting catalog outputting process among the processes of the image information processing system arranged across network 99 shown in FIG. 10. At store apparatus 70, first, a customer trial fitting image (trial fitting image 320) is taken (S301) and input into store apparatus 70. Also, product information on the products that were actually trial fitted and customer information on the customer who performed the trial fitting are input into store apparatus 70 via a scanner, keyboard, code reader (not shown), etc., (S302). Thereafter, store apparatus 70 transmits trial fitting image 320 and the various input information from transmitting/receiving part 71 to management server 60 via network 99 (S303). An option designation, indicating that the customer has requested converted trial fitting images, may also be received at this time.

At management server 60, trial fitting image 320 and various information are received by transmitting/receiving part 61 (S304). If there is an option designation, information on the products to be converted (for example, color information in L*a*b* coordinates, etc.) are acquired. Besides being stored in advance in product information database 22, these information may be acquired as necessary via network 99 from product providing company server 90, for example. The acquired information on products are stored successively in product information database 22.

In trial fitting catalog preparation process 63, a trial fitting catalog is prepared using the received trial fitting image 320 and the various information stored in the various databases (S305). As with the trial fitting catalog shown in FIGS. 2A and 2B, and FIGS. 3A to 3D, this trial fitting catalog is characterized in displaying the taken trial fitting image 320 and containing customer information on the customer who performed the trial fitting, and in addition to cover page 301 and basic page 302, shown in FIGS. 2A and 2B, if there is an option designation, modified image pages 303 and 304 and option pages 1303 and 1304, containing converted trial fitting images 321 and 322 as shown in FIGS. 3A to 3D, are generated. Thereafter, information concerning the prepared trial fitting catalog are stored in the various databases. That is, the various information, such as catalog code 312, order code 313, etc., that are associated with customer code 311 are stored in such databases as customer information database 21, product information database 33, order database 24, etc., (S306). For example, if there is an option designation and related products are imaged, order codes 313 are attached to the respective converted trial fitting images 321 and 322 and order information corresponding to these order codes 313 are stored in order database 24. Thereafter, the prepared trial fitting catalog is sent via network 99 by transmitting/receiving part 61 (S307).

When the trial fitting catalog is received at store apparatus 70 (S308), printout of the trial fitting catalog using printer 13 is performed at store apparatus 70 (S309). The trial fitting catalog that has been output is handed directly to the customer or is sent to the customer by mail, etc. Also, though this trial fitting catalog is generally sent to store apparatus 70, if the e-mail address, etc., of user apparatus 80 is recognized in advance and if the customer operating user apparatus 80 desires, the trial fitting catalog is sent directly to user apparatus 80. That is, when trial fitting catalog is received by user apparatus 80 (S310), printout of the trial fitting catalog is carried out by printer 82, connected to user apparatus 80 (S311). By the above processes, a customer can acquire a trial fitting catalog containing converted trial fitting images 321 and 322.

Figure 12:
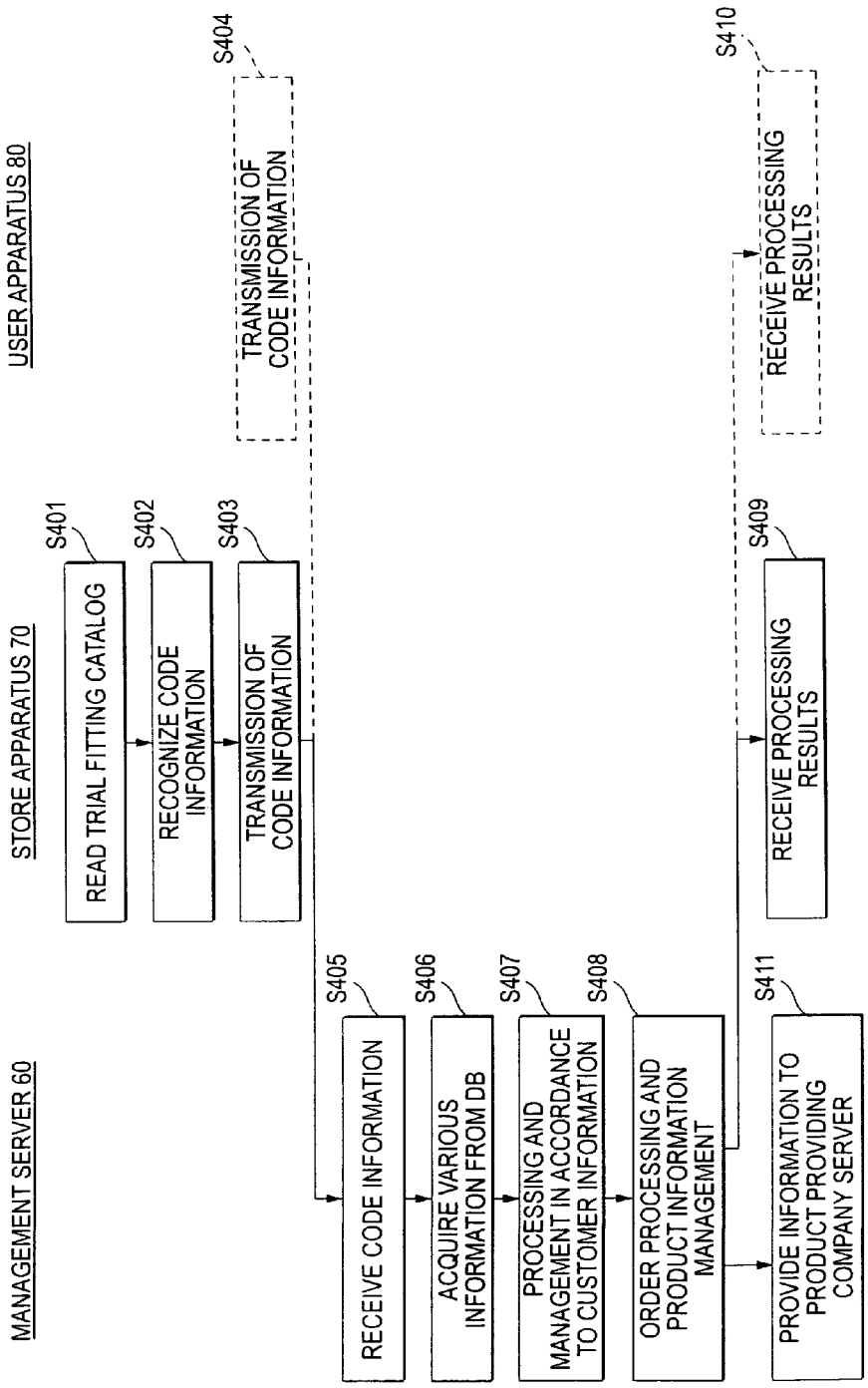
FIG. 12 is a flowchart illustrating a code information recognition process among the processes of the image information processing system arranged across a network shown in FIG. 10.

FIG. 12 is a flowchart illustrating a code information recognition process among the processes of the image information processing system arranged across a network shown in FIG. 10. For example, when a customer visits a store and orders a product that has been trial-fitted, reading of a trial fitting catalog using scanner 12, for example, is performed at store apparatus 70. Also, code information are read using, for example, a predetermined code reader (S401). Code recognition part 74 of store apparatus 70 recognizes customer code 311, catalog code 312, and order code 313 from the trial fitting catalog (S402) and transmits the recognized code information from transmitting/receiving part 71 to management server 60 via network 99 (S403). The ordering work may also be carried out at user apparatus 80. For example, a customer, who intends to order a trial-fitted product or a different-colored product for which converted trial-fitting image 321 has been generated, accesses the URL of management server 60 using, for example, a browser on user apparatus 80. Then upon carrying out log-in and verification processes, etc., based on instructions from the website of management server 60, the number attached to order code 313 is input, for example, to transmit the code information (S404). That is, by input of the order number, etc., which are contained in the trial fitting catalog and include information that are recognizable by the customer, a different-colored product, etc., for example, may be ordered in a simple manner.

Management server 60 receives these code information by means of transmitting/receiving part 61 (S405) and acquires various information from customer information database 21, product information database 22, and order database 24 (S406). Then for example by management part 62, various customer-wise processes, etc., are carried out based on the customer information acquired using customer code 311, or management of the product purchase records, etc., is carried out and the management results are stored in customer information database 21 (S407). Furthermore, order processing based on the order information is executed, for example, at management part 62. In this case, product information management is carried out at management server 60 and the management results are stored in product information database 22 (S408). Thereafter, management server 60 transmits the processing results by means of transmitting/receiving part 61 to store apparatus 70 and user apparatus 80 via network 99. At store apparatus 70, the processing results are received by transmitting/receiving part 71 (S409), or in the case where an order is made directly from user apparatus 80, the processing results are also sent to user apparatus 80 (S410). Information on the products ordered by a customer are also sent to product providing company server 90 of the company providing the products and this provision of information is used for subsequent product development, manufacture, etc., (S411).

The hardware arrangement of a computer device that makes up each of PC 30, shown in FIG. 1, and management server 60, store apparatus 70, user apparatus 80, and product providing company server 90, shown in FIG. 10 shall now be described.

FIG. 13 shows an example of a hardware architecture applicable to these computer devices. The computer device shown in FIG. 13 is equipped with a CPU (Central Processing Unit) 201, which is a computing unit, an M/B (mother board) chip set 202, connecting CPU 201 and various devices, such as a memory module, etc., a main memory 203, connected to CPU 201 via M/B chip set 202 and a CPU bus, and a video card, connected to CPU 201 via M/B chip set 202 and an AGP (Accelerated Graphics Port). Also, an LCD or other display 220, which is a display device, is connected to video card 204.

Furthermore, various devices are connected to M/B chip set 202 via a PCI (Peripheral Component Interconnect) bus, and various devices are connected to M/B chip set 202 via the PCI bus, a bridge circuit 207, and a low-speed bus, such as an ISA (Industry Standard Architecture) bus, etc. As devices connected via the PCI bus, for example, a modem 221 is connected via a parallel port 208 and a printer 222 is connected via parallel port 209. Also, a hard disk device (HDD) 223 and a scanner 224 are connected via a SCSI (Small Computer System Interface) controller 210. A network interface 211 is also connected. A floppy disk drive 212 and a keyboard/mouse 213 are connected to the low-speed bus.

FIG. 13 simply shows an example of the hardware architecture of a computer device for realizing the embodiments of FIG. 1 and FIG. 10, and various other arrangements may be employed as long as these are applicable to the embodiments. For example, in place of providing video card 204, an arrangement wherein just a video memory is installed and the image data are processed at CPU 201 may be employed. Also, as an external storage device, a drive for CD-R (Compact Disc Recordable) and DVD-RAM (Digital Versatile Disc Random Access Memory), etc., may be provided via an interface such as an ATA (AT Attachment) or SCSI controller 210. Furthermore, digital camera 11, shown in FIG. 1 and FIG. 10 is connected to the computer device, for example, via a USB (Universal Serial Bus), etc., which is serial port 208. Also, access to management server 60 from store apparatus 70 shown in FIG. 10 and access to management server 60 from user apparatus 80 is realized by a browser executed by CPU 201. The application programs and browser that execute the various processing functions shown in FIG. 1 and FIG. 10 are read into a main memory 203 and executed by CPU 201. Also, for the various databases, besides the use of hard disk device (HDD) 223, shown in FIG. 13, for example, an external HDD connected via a USB or a storage device connected via an internal network, etc., may be used.

As described in detail above, even in cases where decisions cannot be made easily by just one person due to products being expensive at, for example, a department store, boutique, bridal wear rental store, or other place in which garments are handled, by using the system arrangements of the embodiments and printing out trial fitting images (trial fitting image 320) the catalog information can be shared with other people at any location. Also, since customer orders can be made by the input of a trial fitting catalog number or an order code 313 or order number in a catalog, etc., and complicated numbers are not input, errors are rarely made by customers. Furthermore, orders can be made simply by scanning code information indicated in a trial fitting catalog by means of scanner 21, for example, in the case of a store or by the input of an order number, etc., in the case of using the internet or other network 99. Yet furthermore, the systems, to which the respective embodiments are applied, provide catalogs dedicated to specific customers and thus a high sales promotion effect can be anticipated. In particular, as a benefit for the sales dealer side, by the provision of customer codes in the trial fitting catalogs, the relationship between customer preferences for individual products and orders, which were completely separated in the prior art, can be ascertained accurately with the systems of the embodiments. Also, the embodiments are arranged so that along with trial fitting image 320, converted trial fitting images 321 and 322 are prepared for related products that differ in color, etc., from trial fitted products and these images are included in the trial fitting catalog. Improved product sales records can thus be anticipated. Also, by outputting images upon synthesizing background information to trial fitting image 320 in consideration of the circumstances of use of the corresponding products, the impression of the customer wearing the products can be fortified to improve the sales record further.

The output unit of the image information processing system to which the present invention is applied may be characterized in outputting the order code information in a state that is recognizable by an apparatus or a customer.

The customer information that are stored in the customer information database may be characterized in containing information indicating that a customer has put on products.

Furthermore, the order code information may be characterized in being information that enable batch ordering of a plurality of products.

The trial fitting catalog that is read by the trial fitting catalog reading unit contains information on the products that has been put on, a recognition unit recognizes the information on the products contained in the trial fitting catalog, and based on the information on the products recognized by the recognition unit, product information are read from the product information database by means of a product information reading unit. Also, the results of the order processing, based on the product information read by the product information reading unit, may be reflected and stored in the customer information database by means of a customer information management unit.

Also, the image information processing system to which this invention is applied may include a code information generating unit, generating code information for specifying related products contained in converted image information generated by the generating unit, and a printing unit, printing together the converted image information generated by the generating unit and the code information generated by the code information generating unit. Here, the region recognition unit may be characterized in recognizing, based on the color information acquired from the color information acquisition unit, regions of color information within fixed ranges as product regions. Also, the color information acquisition unit and the related product color information acquisition unit may be characterized in acquiring color information from the product information database that stores the product information.

It is preferable for the image information processing system to which this invention is applied to further include a color information acquisition unit, acquiring color information on the products worn, a region recognition unit, using the color information acquired by the color information acquisition unit to recognize the product regions in the image information acquired by the image information acquisition unit, and a related product color information acquisition unit, acquiring color information on related products that differ in color from the products worn, and be characterized in that the generating unit replaces the color information of the above-mentioned regions in the image information with the color information of the related products acquired from the related product color information acquisition unit to generate converted image information. For example, the synthesis of the background image and the conversion to the color information of the related products can then be applied at the same time. A code information generating unit, generating code information for specifying the products and/or the related products, and a printing unit, printing together the converted image information generated by the generating unit and the code information generated by the code information generating unit, may also be included.

Each of these systems may be one with which the casing is formed as a single apparatus, one with which most of the functions are centralized, for example, in a computer device, or one with which the various functions are distributed across a network.

The output unit of the image information processing apparatus to which the present invention is applied may be characterized in printing out the order code information, stored in a database and used for ordering a product that has been worn by a customer, and image information at the same time. This output unit is arranged to enable, in the case where a customer has put on a plurality of products at the same time, batch ordering of the plurality of products using the order code information. Furthermore, this output unit may be characterized in printing out sheets that are in accordance to the amount of trial fitting by a customer.

The image information processing apparatus to which this invention is applied may further include an image taking condition acquisition unit, acquiring the image taking conditions at the time at which an image of a subject is taken by the image taking unit, an image information storage unit, storing synthesis image information that are to be synthesized, and a processing unit, reading predetermined synthesis image information from the image information storage unit and applying a predetermined process on the image information taken by the image taking unit based on the state of the synthesis image information and the image taking conditions acquired by the image taking condition acquisition unit, and be characterized in that the converted image information generating unit generates converted image information by synthesizing the image information, to which the predetermined process has been applied by the processing unit, with the synthesis image information that have been read. Furthermore, if the printing unit is made to be characterized in printing the order code information for specifying the related products, the information of which are contained in the converted image information, and the converted image information at the same time, excellence is provided in that the ordering process of the related products can be performed smoothly.

The image information outputting method to which this invention is applied may be characterized in that in the case where a customer puts on a plurality of products, order code information, enabling batch ordering of the plurality of products, are generated and the generated order code information are output at the same time as the image information.

With the image information outputting method to which this invention is applied, the region recognizing step may be characterized in that a region of color information within a fixed range from the acquired color information is recognized as a product region. Also, the printout step is characterized in that code information for specifying the related products are printed out together. Furthermore, this printout step is characterized in that the converted image information are printed out together with the image information and the code information for specifying the products contained in the image information.

Furthermore, by arranging so that a step of acquiring the image taking conditions at the time at which the image information on the subject have been taken, a step of reading predetermined synthesis image information from the image information storage unit, which stores synthesis image information to be synthesized, a step of applying a predetermined process on the acquired image information based on the state of the synthesis image information that have been read and the acquired image taking conditions, and a step of generating converted image information by synthesizing the image information, to which the predetermined process has been applied, with the synthesis image information that have been read, the impression of trial fitting of the products can be fortified further.

The code information processing method to which this invention is applied may furthermore be characterized in recognizing order code information for ordering products included in a trial fitting catalog, specifying the products from an order database, storing ordering information corresponding to the order code information, based on the recognized order code information, and making the information on the specified products be reflected in the customer information database.

The program to which this invention is applied may furthermore realize a function, which, in the case where a customer puts on a plurality of products, generates order code information that enable batch ordering of the plurality of products, and a function of outputting the generated order code information and the image information at the same time.

The program to which this invention is applied may furthermore realize a function of acquiring the image taking conditions at the time at which the image information on the subject has been taken, a function of reading predetermined synthesis image information from the image information storage unit, which stores synthesis image information to be synthesized, a function of applying a predetermined process, such as filtering, on the acquired image information based on the state of the synthesis image information that have been read and the acquired image taking conditions, and a function of generating converted image information by synthesizing the image information; to which the predetermined process has been applied, with the synthesis image information that have been read.

In providing these programs in a computer, in addition to the form of providing the programs, for example, in a state in which the programs are installed in a computer device, the form of providing programs to be executed by a computer in a storage medium storing the programs in a manner enabling reading by the computer may also be considered. In this case, for example, a DVD and CD-ROM medium, etc., corresponds to being the storage medium and each program is read by a DVD or CD-ROM reading device, etc., and the read program is stored in an HDD or flash ROM, etc., and executed by a CPU. These programs may also be provided via a network, for example, from a program transmitting device.

As examples of utilization of this invention, a computer device used in a store, etc., a server, etc., which provides information via the internet, etc., may be considered.

The entire disclosures of Japanese Patent Application No. 2003-330767 filed on Sep. 22, 2003 and No. 2003-330705 filed on Sep. 22, 2003, including the specifications, claims, drawings, and abstracts, are incorporated herein by reference in their entirety.

What is claimed is:

1. A non-transitory computer-readable medium storing a program that causes a computer to execute image information processing, the image information processing comprising:
   acquiring image information of a subject wearing products;
   acquiring color information on the products from a product information storage unit;
   recognizing regions of the products in the image information using the acquired color information;
   acquiring, from the product information storage unit, color information on related products that differ in color from the products;
   generating converted image information by changing the background scene image of the subject;
   generating code information to specify the related products contained in the converted image information,
   acquiring the image taking conditions at the time at which the image information on the subject are taken,
   reading predetermined synthesis image information from an image information storage unit, which stores synthesis image information to be synthesized;
   applying a predetermined process on the acquired image information based on the state of the synthesis image information that has been read and the acquired image taking conditions; and
   generating converted image information by synthesizing the image information, to which the predetermined process has been applied, and the read synthesis image information,
   wherein the code information specifies material information of the related products.

2. An image information outputting method programmed to be executable by a computer comprising the steps of:
   acquiring, using the computer, image information of a subject wearing products;
   acquiring, using the computer, color information on the products from a product information storage unit;
   recognizing, using the computer, regions of the products in the image information using the acquired color information;
   acquiring, using the computer, from the product information storage unit, color information on related products that differ in color from the products;
   generating, using the computer, converted image information by changing the background scene image of the subject;
   generating code information using the computer to specify the related products contained in the converted image information;
   acquiring, using the computer, the image taking conditions at the time at which the image information on the subject have been taken;
   reading, using the computer, predetermined synthesis image information from an image information storage unit, which stores synthesis image information to be synthesized;
   applying, using the computer, a predetermined process on the acquired image information based on the state of the synthesis image information that has been read and the acquired image taking conditions;
   generating, using the computer, converted image information by synthesizing the image information, to which the predetermined process has been applied, and the synthesis image information that has been read; and
   printing out the generated converted image information,
   wherein the code information specifies material information of the related products.

* * * * *